(12) United States Patent
Stevens et al.

(10) Patent No.: US 7,962,256 B2
(45) Date of Patent: Jun. 14, 2011

(54) SPEED LIMITING IN ELECTRIC VEHICLES

(75) Inventors: Jon M. Stevens, Manchester, NH (US); David Robinson, Los Altos, CA (US)

(73) Assignee: Segway Inc., Bedford, NH (US)

( * ) Notice: Subject to any disclaimer, the term of this patent is extended or adjusted under 35 U.S.C. 154(b) by 205 days.

(21) Appl. No.: 11/837,687

(22) Filed: Aug. 13, 2007

(65) Prior Publication Data

US 2008/0039990 A1     Feb. 14, 2008

Related U.S. Application Data

(60) Provisional application No. 60/837,440, filed on Aug. 11, 2006.

(51) Int. Cl.
    *G05D 3/00*     (2006.01)

(52) U.S. Cl. ............ 701/22; 701/29; 701/109; 701/123; 701/300; 180/167; 180/65.1; 180/65.25; 180/65.8; 180/65.245

(58) Field of Classification Search ............. 701/22, 701/33, 29, 109, 123; 180/167, 65.1, 65.25, 180/65.8, 65.245; 340/439, 450
See application file for complete search history.

(56) References Cited

U.S. PATENT DOCUMENTS

| 584,127 | A | 6/1897 | Draullette et al. | |
| 849,270 | A | 4/1907 | Schafer et al. | |
| 2,742,973 | A | 4/1956 | Johannesen et al. | 180/8 |
| 3,145,797 | A | 8/1964 | Taylor | 180/21 |
| 3,260,324 | A | 7/1966 | Suarez | 180/10 |
| 3,348,518 | A | 10/1967 | Forsyth et al. | 115/1 |
| 3,374,845 | A | 3/1968 | Selwyn | 180/6.5 |
| 3,399,742 | A | 9/1968 | Malick | 180/21 |
| 3,446,304 | A | 5/1969 | Alimanestiano | 180/9.24 |
| 3,450,219 | A | 6/1969 | Fleming | 180/8 |
| 3,515,401 | A | 6/1970 | Gross | 280/5.26 |
| 3,568,018 | A | 3/1971 | Macdonald | 318/151 |
| 3,580,344 | A | 5/1971 | Floyd | 180/8 A |
| 3,626,177 | A | 12/1971 | Franke | 246/1 |

(Continued)

FOREIGN PATENT DOCUMENTS

DE      3242880 A1     6/1983

(Continued)

OTHER PUBLICATIONS

Vos, D., Dynamics and Nonlinear Adaptive Control of an Autonomous Unicycle, Massachusetts Institute of Technology, 1989.

(Continued)

*Primary Examiner* — Mark Hellner
*Assistant Examiner* — Redhwan Mawari
(74) *Attorney, Agent, or Firm* — Pierce Atwood LLP

(57) ABSTRACT

A controller and methods for controlling the speed of a vehicle having an electric motorized drive is provided. In one embodiment, a method involves determining a steady state average torque and a torque during acceleration or deceleration of the vehicle traveling over an underlying surface. Speed of the vehicle is controlled based on the steady state average torque, the torque during acceleration or deceleration the measured regeneration current generated by a motorized drive arrangement of the vehicle that applies torque to at least one ground-contacting element of the vehicle for traveling over the underlying surface, weight of the vehicle and payload, the torque applied to the ground-contacting element, acceleration of the vehicle and the speed of the vehicle.

15 Claims, 26 Drawing Sheets

U.S. PATENT DOCUMENTS

| | | | | |
|---|---|---|---|---|
| 3,872,945 | A | 3/1975 | Hickman et al. | 180/65 R |
| 3,876,025 | A | 4/1975 | Green | 180/21 |
| 3,952,822 | A | 4/1976 | Udden et al. | 180/21 |
| 3,984,748 | A | 10/1976 | Sullivan | 318/648 |
| 4,019,602 | A | 4/1977 | Habiger | 180/101 |
| 4,050,533 | A | 9/1977 | Seamone | 180/6.5 |
| 4,094,372 | A | 6/1978 | Notter | 180/1 G |
| 4,109,741 | A | 8/1978 | Gabriel | 180/21 |
| 4,151,892 | A | 5/1979 | Francken | 180/77 H |
| 4,212,443 | A | 7/1980 | Duncan et al. | 244/177 |
| 4,222,449 | A | 9/1980 | Feliz | 180/8 A |
| 4,241,931 | A | 12/1980 | Healy | 280/205 |
| 4,244,215 | A | 1/1981 | Merhav et al. | 73/178 R |
| 4,247,127 | A | 1/1981 | Wilkes | 280/28.5 |
| 4,260,942 | A | 4/1981 | Fleming | 318/565 |
| 4,293,052 | A | 10/1981 | Daswick et al. | 180/219 |
| 4,324,414 | A | 4/1982 | Wilkes | 280/242 WC |
| 4,414,937 | A | 11/1983 | Ueda et al. | 123/198 D |
| 4,442,723 | A | 4/1984 | Auer | 74/5.47 |
| 4,507,737 | A | 3/1985 | LaSarge et al. | 364/453 |
| 4,536,686 | A | 8/1985 | Gartner | 318/434 |
| 4,560,022 | A | 12/1985 | Kassai | 180/65.1 |
| 4,566,707 | A | 1/1986 | Nitzberg | 180/8.2 |
| 4,607,205 | A | 8/1986 | Kito et al. | 318/778 |
| 4,685,693 | A | 8/1987 | Vadjunec | 280/242 WC |
| 4,709,772 | A | 12/1987 | Brunet | 180/21 |
| 4,716,980 | A | 1/1988 | Butler | 180/19.2 |
| 4,796,716 | A | 1/1989 | Masuda | 180/176 |
| 4,797,826 | A | 1/1989 | Onogi et al. | 364/426.04 |
| 4,798,255 | A | 1/1989 | Wu | 180/65.1 |
| 4,802,542 | A | 2/1989 | Houston et al. | 180/65.5 |
| 4,809,804 | A | 3/1989 | Houston et al. | 180/65.5 |
| 4,874,055 | A | 10/1989 | Beer | 180/19.2 |
| 4,979,582 | A | 12/1990 | Forster | 180/20 |
| 4,998,596 | A | 3/1991 | Miksitz | 180/213 |
| 5,011,171 | A | 4/1991 | Cook | 280/221 |
| 5,033,000 | A | 7/1991 | Littlejohn et al. | 364/424.05 |
| 5,070,959 | A | 12/1991 | Grabowski | |
| 5,111,899 | A | 5/1992 | Reimann | 180/65.1 |
| 5,121,806 | A | 6/1992 | Johnson | 180/65.5 |
| 5,168,947 | A | 12/1992 | Rodenborn | 180/19.1 |
| 5,171,173 | A | 12/1992 | Henderson et al. | 440/7 |
| 5,194,872 | A | 3/1993 | Musoff et al. | 342/358 |
| 5,215,159 | A | 6/1993 | Nishida | 180/179 |
| 5,221,883 | A | 6/1993 | Takenaka et al. | 318/568.12 |
| 5,248,007 | A | 9/1993 | Watkins et al. | 180/9.32 |
| 5,303,156 | A | 4/1994 | Matsuoka et al. | 364/424.05 |
| 5,350,033 | A | 9/1994 | Kraft | 180/167 |
| 5,366,036 | A | 11/1994 | Perry | 180/65.1 |
| 5,376,868 | A | 12/1994 | Toyoda et al. | 318/587 |
| 5,390,753 | A | 2/1995 | Parker | 180/19.1 |
| 5,397,890 | A | 3/1995 | Schueler et al. | 250/221 |
| 5,430,432 | A | 7/1995 | Camhi et al. | 340/438 |
| 5,487,441 | A | 1/1996 | Endo et al. | 180/179 |
| 5,645,135 | A | 7/1997 | Peterson, Jr. | 180/272 |
| 5,670,780 | A | 9/1997 | Lewis | 250/231.14 |
| 5,701,965 | A | 12/1997 | Kamen et al. | 180/7.1 |
| 5,701,968 | A | 12/1997 | Wright-Ott et al. | 180/65.1 |
| 5,712,426 | A | 1/1998 | Sapuppo et al. | 73/504.03 |
| 5,764,014 | A | 6/1998 | Jakeway et al. | 318/587 |
| 5,775,452 | A | 7/1998 | Patmont | 180/181 |
| 5,791,425 | A | 8/1998 | Kamen et al. | 180/7.1 |
| 5,794,730 | A | 8/1998 | Kamen | 180/7.1 |
| 5,809,755 | A | 9/1998 | Velke et al. | 56/10.8 |
| 5,854,843 | A | 12/1998 | Jacknin et al. | 381/25 |
| 5,860,480 | A | 1/1999 | Jayaraman et al. | 172/2 |
| 5,950,754 | A | 9/1999 | Ondrish, Jr. | 180/181 |
| 5,971,091 | A | 10/1999 | Kamen et al. | 180/218 |
| 5,973,463 | A | 10/1999 | Okuda et al. | 318/430 |
| 5,975,225 | A | 11/1999 | Kamen et al. | 180/7.1 |
| 6,003,624 | A | 12/1999 | Jorgensen et al. | 180/6.5 |
| 6,037,861 | A | 3/2000 | Ying | 340/441 |
| 6,037,862 | A | 3/2000 | Ying | 340/441 |
| 6,050,357 | A | 4/2000 | Staelin et al. | 180/65.1 |
| 6,059,062 | A | 5/2000 | Staelin et al. | 180/181 |
| 6,125,957 | A | 10/2000 | Kauffmann | 180/65.1 |
| 6,131,057 | A | 10/2000 | Tamaki et al. | 701/22 |
| 6,148,939 | A | 11/2000 | Brookhart et al. | 180/6.48 |
| 6,155,367 | A | 12/2000 | Alber | 180/65.5 |
| 6,170,598 | B1 | 1/2001 | Furukawa | 180/334 |
| 6,179,076 | B1 | 1/2001 | Fernie et al. | 180/65.1 |
| 6,205,375 | B1 | 3/2001 | Naito | 701/1 |
| 6,246,232 | B1 | 6/2001 | Okumura | 324/207.2 |
| 6,253,143 | B1 | 6/2001 | Silvernagle et al. | 701/93 |
| 6,276,230 | B1 | 8/2001 | Crum et al. | 74/551.9 |
| 6,288,505 | B1 | 9/2001 | Heinzmann et al. | 318/139 |
| 6,302,226 | B1 | 10/2001 | Kanno et al. | 180/6.5 |
| 6,302,230 | B1 | 10/2001 | Kamen et al. | 180/171 |
| 6,332,103 | B1 | 12/2001 | Steenson, Jr. et al. | 701/1 |
| 6,334,084 | B1 | 12/2001 | Moteki et al. | 701/114 |
| 6,367,817 | B1 | 4/2002 | Kamen et al. | 280/5.507 |
| 6,377,906 | B1 | 4/2002 | Rowe | 702/151 |
| 6,408,240 | B1 | 6/2002 | Morrell et al. | 701/82 |
| 6,443,250 | B1 | 9/2002 | Kamen et al. | 180/8.1 |
| 6,527,071 | B1 | 3/2003 | Villedieu | 180/8.1 |
| 6,538,411 | B1 | 3/2003 | Field et al. | 318/638 |
| 6,543,564 | B1 | 4/2003 | Kamen et al. | 180/89.13 |
| 6,581,714 | B1 | 6/2003 | Kamen et al. | 180/333 |
| 6,651,763 | B1 | 11/2003 | Kamen et al. | 180/171 |
| 6,651,766 | B2 | 11/2003 | Kamen et al. | 180/218 |
| 6,779,621 | B2 | 8/2004 | Kamen et al. | 180/282 |
| 6,789,640 | B1 | 9/2004 | Arling et al. | 180/282 |
| 6,796,396 | B2 | 9/2004 | Kamen et al. | 180/272 |
| 6,827,163 | B2 | 12/2004 | Amsbury et al. | 180/7.1 |
| 6,868,931 | B2 | 3/2005 | Morrell et al. | 180/170 |
| 6,874,591 | B2 | 4/2005 | Morrell et al. | 180/179 |
| 6,965,206 | B2 | 11/2005 | Kamen et al. | 318/139 |
| 7,017,686 | B2 | 3/2006 | Kamen et al. | 180/7.1 |
| 7,275,607 | B2 | 10/2007 | Kamen et al. | 180/7.1 |
| 2002/0063006 | A1 | 5/2002 | Kamen et al. | 180/171 |
| 2003/0205419 | A1 | 11/2003 | Kamen et al. | 180/21 |
| 2003/0231022 | A1* | 12/2003 | Morrell et al. | 324/426 |
| 2004/0011573 | A1 | 1/2004 | Kamen et al. | 180/7.1 |
| 2004/0055795 | A1 | 3/2004 | Kamen et al. | 180/7.1 |
| 2004/0118622 | A1* | 6/2004 | Morrell et al. | 180/65.1 |
| 2004/0162683 | A1 | 8/2004 | Verbrugge et al. | 702/64 |
| 2005/0121866 | A1 | 6/2005 | Kamen et al. | 280/47.18 |
| 2006/0108156 | A1 | 5/2006 | Heinzmann et al. | 180/8.2 |
| 2006/0108165 | A1 | 5/2006 | Kamen et al. | 180/233 |

FOREIGN PATENT DOCUMENTS

| | | |
|---|---|---|
| EP | 0537698 A1 | 4/1993 |
| EP | 0663313 A1 | 7/1995 |
| FR | 2 756 521 A1 | 6/1998 |
| JP | 57087766 | 6/1982 |
| JP | 01316810 | 12/1989 |
| JP | 4-201793 | 7/1992 |
| WO | WO86/05752 | 10/1986 |
| WO | WO96/23478 | 8/1996 |
| WO | WO98/46474 | 10/1998 |
| WO | WO00/75001 | 12/2000 |

OTHER PUBLICATIONS

Vos, D., Nonlinear Control of an Autonomous Unicycle Robot: Practical Issues, Massachusetts Institute of Technology, 1992.

Koyanagi et al., A Wheeled Inverse Pendulum Type Self-Contained Mobile Robot and its Two Dimensional Trajectory Control, Proceeding of the Second International Symposium on Measurement and Control in Robotics, Japan 1992, pp. 891-898.

Roy et al., Five-Wheel Unicycle System, Medical & Biological Engineering & Computing, vol. 23, No. 6, United Kingdom 1985, pp. 593-596.

Vos et al., Dynamics and Nonlinear Adaptive Control of an Autonomous Unicycle-Theory and Experiment, American Institute of Aeronautics and Astronautics, A90-26772 10-39, Washington, D.C. 1990, pp. 487-494 (Abstract only).

* cited by examiner

SPEED LIMITING IN ELECTRIC VEHICLES

RELATED APPLICATIONS

The present application claims priority to U.S. Provisional Patent Application No. 60/837,440, filed Aug. 11, 2006, which is incorporated herein by reference.

FIELD OF THE INVENTION

The present invention pertains to control of electric vehicles, and in particular, controlling and limiting electric vehicle speed.

BACKGROUND OF THE INVENTION

A wide range of transporters and methods are known for transporting human subjects. Typically, such transporters rely upon static stability and are designed for stability under all foreseen conditions of placement of their ground-contacting members with an underlying surface. For example, a gravity vector acting on the center of gravity of an automobile passes between the points of ground contact of the automobile's wheels and the suspension of the automobile keeps all wheels on the ground at all times making the automobile stable. Although, there are conditions (e.g., increase in speed and sharp turns) which cause otherwise stable transporters to become unstable.

A dynamically stabilized transporter, also known as a balancing transporter, is a type of transporter that has a control system that actively maintains the stability of the transporter while the transporter is operating. The control system maintains the stability of the transporter by continuously sensing the orientation of the transporter, determining the corrective action necessary to maintain stability, and commanding the wheel motors to make the corrective action. If the transporter loses the ability to maintain stability, such as through the failure of a component or a lack of sufficient power, the rider may experience a sudden loss of balance.

For vehicles that maintain a stable footprint, coupling between steering control and control of the forward motion of the vehicles is not an issue of concern. Under typical road conditions, stability is maintained by virtue of the wheels being in contact with the ground throughout the course of a turn. In a balancing transporter, however, any torque applied to one or more wheels affects the stability of the transporter. Coupling between steering and balancing control mechanisms is one subject of U.S. Pat. No. 6,789,640, which is incorporated herein by reference.

SUMMARY OF THE INVENTION

The invention, in one aspect, features a computerized method for controlling the speed of a vehicle having an electric motorized drive. The method involves determining steady-state average torque and torque during acceleration and deceleration of the vehicle traveling over underlying surface. The method also involves controlling the speed of the vehicle based on the steady-state average torque, the torque during acceleration and deceleration, a measured actuator current generated by a motorized drive arrangement of the vehicle that applies torque to at least one ground-contacting element of the vehicle for traveling over the underlying surface. Controlling the speed of the vehicle is also controlled based on weight of the vehicle and a payload, the torque applied to the ground-contacting element, acceleration of the vehicle and speed of the vehicle.

In some embodiments, controlling the speed of the vehicle involves determining an acceleration-compensated average current. In some embodiments, controlling the speed of the vehicle involves determining an amount of actuator current required for accelerating or decelerating the vehicle. In some embodiment, determining the amount of actuator current required for accelerating or decelerating the vehicle is based on the speed of the vehicle and the slope of the underlying surface. In some embodiments, determining the acceleration-compensated average current involves subtracting actuator current caused by acceleration or deceleration from the measured actuator current of the vehicle.

In some embodiments, the vehicle is a dynamically stabilized transporter with a maximum allowable speed of the vehicle controlled by modulating a pitch component of the vehicle. In some embodiments, a pitch controller modulates the maximum allowable speed of the vehicle based on the acceleration-compensated average current. In some embodiments, the method also involves decreasing the maximum allowable speed of the vehicle if regeneration current is increasing. In some embodiments, the method also involves increasing the maximum allowable speed of the vehicle if regeneration current is decreasing. In some embodiments, acceleration and deceleration of the vehicle is achieved at least primarily by operation of the motorized drive arrangement. In some embodiments, the speed of the vehicle is controlled when the measured current exceeds an overall current threshold. In some embodiments, the overall current threshold is based on experience level of a user. In some embodiments, the vehicle is a statically stable transporter. In some embodiments, the weight of the vehicle and payload is an estimate. In some embodiments, the weight of the vehicle and payload is a measurement.

The invention, in another aspect, features a controller for controlling the speed of a vehicle having a motorized drive. The controller includes a torque module that determines steady-state average torque and torque during acceleration and deceleration of the vehicle traveling over an underlying surface. The controller also includes a speed module that receives the steady-state average torque and torque during acceleration and deceleration from the torque module and outputs a desired vehicle speed command (e.g., pitch angle). The desired pitch angle is based on the steady-state average torque, the torque during acceleration and deceleration, weight of the vehicle and payload, a measured current generated by a motorized drive arrangement of the vehicle that applies torque to at least one ground-contacting element of the vehicle for traveling over the underlying surface, the torque applied by the motorized drive arrangement and speed of the vehicle.

In some embodiments, the controller controls the speed of the vehicle when an acceleration-compensated average is below a threshold. In some embodiments, the controller includes a pitch controller module for controlling pitch of the vehicle to modulate speed of the vehicle based on the vehicle speed command (e.g., desired pitch angle).

The invention, in another aspect, features a vehicle having an electric motorized drive. The vehicle includes a platform that supports a payload. The vehicle also includes a ground-contacting module coupled to the platform that includes at least one ground-contacting element for travels over an underlying surface. The vehicle also includes a motorized drive arrangement for applying torque to the at least one ground-contacting element. The vehicle also includes a power source for energizing the motorized drive arrangement. The vehicle also includes a controller that limits the speed of the ground-contacting element based on weight of the vehicle and the payload and slope of the underlying surface.

In some embodiments, the vehicle includes a torque module that determines steady-state average torque and torque during acceleration and deceleration of the vehicle. In some embodiments, the vehicle includes a speed module that outputs a desired vehicle speed command based on the steady-state average torque, the torque during acceleration and deceleration, a measured current generated by the motorized drive arrangement, the weight of the vehicle and the payload, the torque applied by the motorized drive arrangement, and the speed of the vehicle.

In some embodiments, the vehicle includes a speed controller that controls speed of the vehicle based on the vehicle speed command. In some embodiments, the vehicle wherein the vehicle speed command is a desired pitch angle of the vehicle and the speed controller is a pitch controller that controls pitch of the vehicle to control the speed of the vehicle based on a desired pitch angle. In some embodiments, the vehicle is a dynamically stabilized transporter and maximum allowable speed of the vehicle is controlled by modulating a pitch component of the vehicle.

BRIEF DESCRIPTION OF THE DRAWINGS

The foregoing features of the invention will be more readily understood by reference to the following detailed description, taken with reference to the accompanying drawings, in which.

DETAILED DESCRIPTION OF ILLUSTRATIVE EMBODIMENTS

Embodiments of the present invention are useful in vehicles that utilize electric motors and drives as the sole or primary means of applying force/torque to the vehicle wheels for both acceleration and deceleration for traveling over an underlying surface. Such vehicles typically are motoring or consuming energy when operating to drive forward. Sometimes when traveling down a sufficiently steep hill, the drive actuator may need to apply a reverse torque or regenerate in order to maintain a steady speed without accelerating. Embodiments of the present invention are useful with balancing and non-balancing vehicles where motoring and braking are accomplished by the same vehicle component (e.g., an electric motor). For example, embodiments of the present invention are useful with statically stable vehicles and dynamically stabilized vehicles (e.g., dynamically stabilized balancing transporters).

In electric motor vehicles, the amount of available actuator capability used in decelerating during uphill, downhill or flat travel should be understood. The amount of actuator capability used for acceleration or deceleration limits the braking capability of the vehicle. Knowing how much of the actuator capability is used for accelerating or decelerating and how much remains in reserve allows the system to alter the vehicle motion to inhibit undesirable dynamics. The undesirable dynamics, such as reduced braking capability, could result from the vehicle traveling downhill as compared to traveling over flat ground.

A transporter may be said to act as 'balancing' if it is capable of operation on one or more wheels but would be unable to stand on the wheels but for operation of a control loop governing operation of the wheels. A balancing transporter lacks static stability but is dynamically balanced. A transporter may advantageously be used as a mobile work platform or a recreational vehicle such as a golf cart, or as a delivery vehicle. The wheels, or other ground-contacting elements, that provide contact between such a transporter and the ground or other underlying surface, and minimally support the transporter with respect to tipping during routine operation, are referred to herein as 'ground-contacting elements.'

Figure 1:
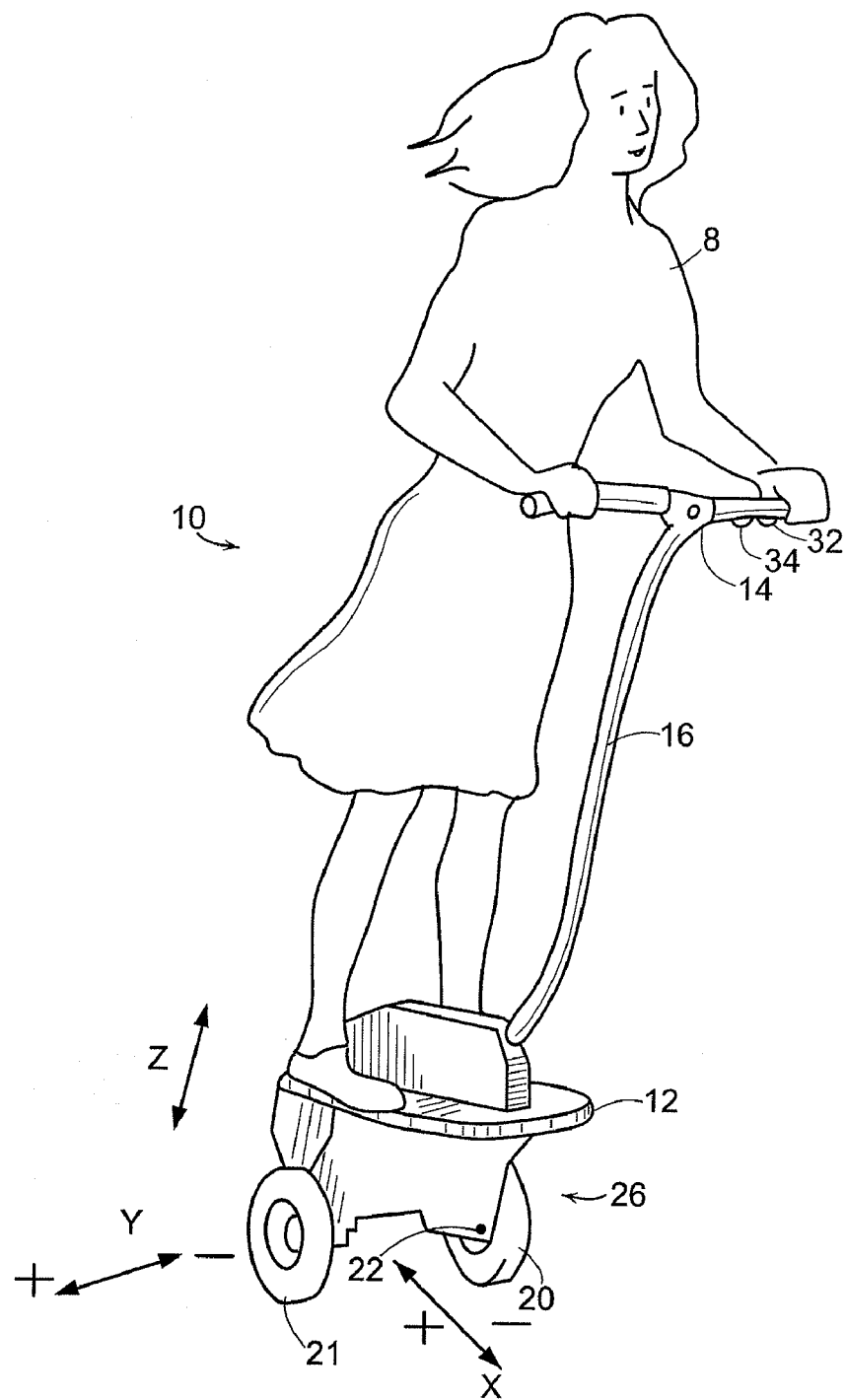
FIG. 1 is a schematic illustration of a transporter, as described in detail in U.S. Pat. No. 6,302,230, to which the present invention may advantageously be applied.

FIG. 1 shows a balancing personal transporter, designated generally by numeral 10, and described in detail in U.S. Pat. No. 6,302,230, as an example of a device to which the present invention may advantageously be applied. A subject 8 stands on a support platform 12 and holds a grip 14 on a handle 16 attached to the platform 12. A control loop may be provided so that leaning of the subject results in the application of torque to wheel 20 about axle 22 by means of a motor drive. Transporter 10, however, is statically unstable, and, absent operation of the control loop to maintain dynamic stability, transporter 10 will no longer be able to operate in its typical operating orientation. "Stability" as used herein, refers to the mechanical condition of an operating position with respect to which the system will naturally return if the system is perturbed away from the operating position in any respect.

Different numbers of wheels or other ground-contacting members may advantageously be used in various embodiments of the invention as particularly suited to varying applications. U.S. Patent Publication No. 2006/0108156, incorporated herein by reference, describes a balancing all-terrain vehicle in FIG. 6 and FIG. 7. The all-terrain vehicle has two front wheels and two rear wheels. Each rear wheel is driven by its own actuator. Thus, within the scope of the present invention, the number of ground-contacting members may be any number equal to, or greater than, one.

Figure 2:
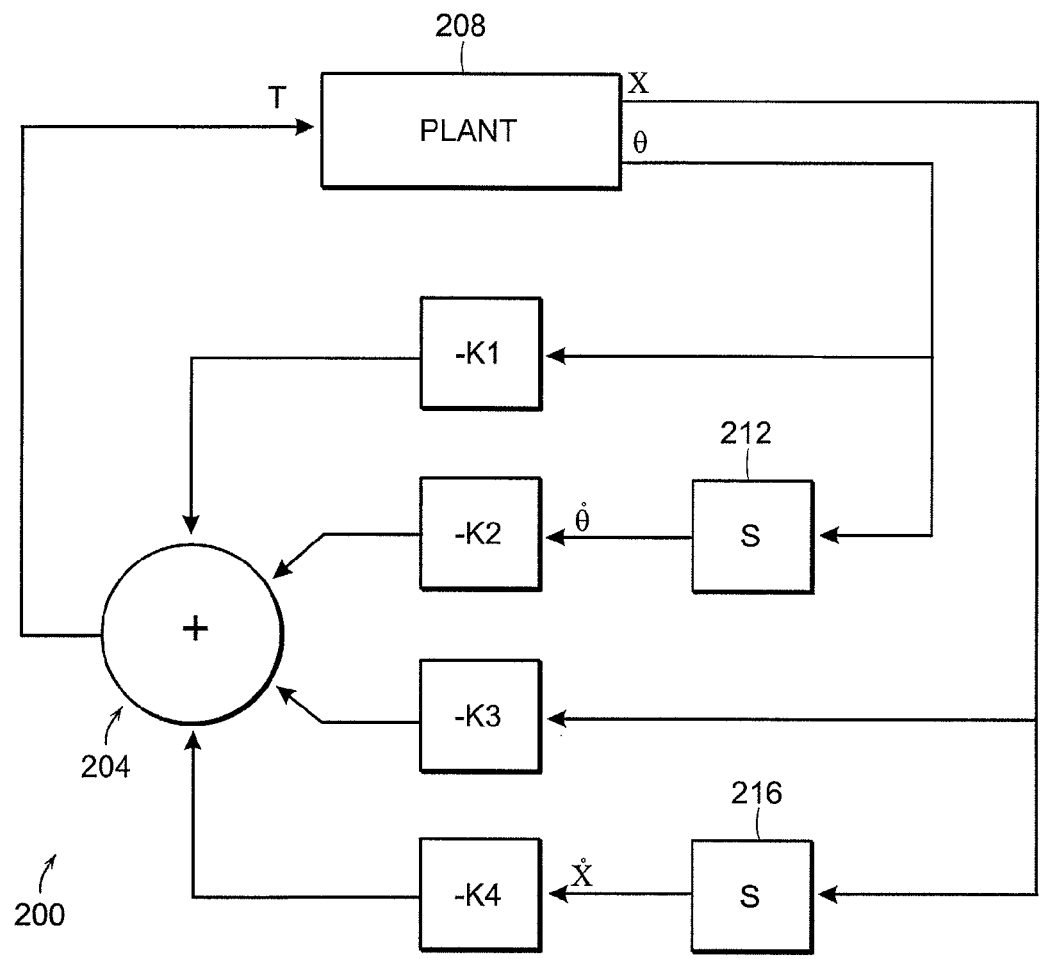
FIG. 2 is a block diagram of a control loop for dynamically controlling the stability of a vehicle in the fore-aft plane, for an illustrative embodiment of the invention.

FIG. 2 shows a control loop 200 for dynamically maintaining stability of a vehicle (plant 208) in the fore-aft plane so that the vehicle remains upright. This control loop 200 requires the pitch state as an input. U.S. Pat. Nos. 5,701,965 and 5,791,425 describe vehicles that can be operated using the control loop 200 of FIG. 2. The vehicles require measurement of instantaneous pitch state for active control of the vehicles' stability. These patents are incorporated by reference herein in their entirety. The plant 208 of FIG. 2 is equivalent to the equations of motion of a locomotion system driven by a single motor. T identifies the wheel torque. Theta ($\theta$) identifies the fore-aft inclination (i.e., the pitch angle), X identifies the fore-aft displacement along a surface relative to a reference point, and a dot over a variable denotes a variable differential with respect to time.

Control gains $K_1$, $K_2$, $K_3$ and $K_4$, differentiators 212 and 216 and a summer 204 are used to achieve balance. To achieve dynamic control and to insure stability of the system, and to keep the system in the neighborhood of a reference point on the surface, the wheel torque T in this embodiment is set to satisfy the following equation:

$$T = K_1\theta + K_2\theta_r + K_3 X + K_4 X_r \quad\quad\quad (\text{EQN. 1})$$

The values of the gains $K_1$, $K_2$, $K_3$ and $K_4$ are dependent on settings of the control loop, physical parameters of the system, and other effects such as gravity.

Figure 3:
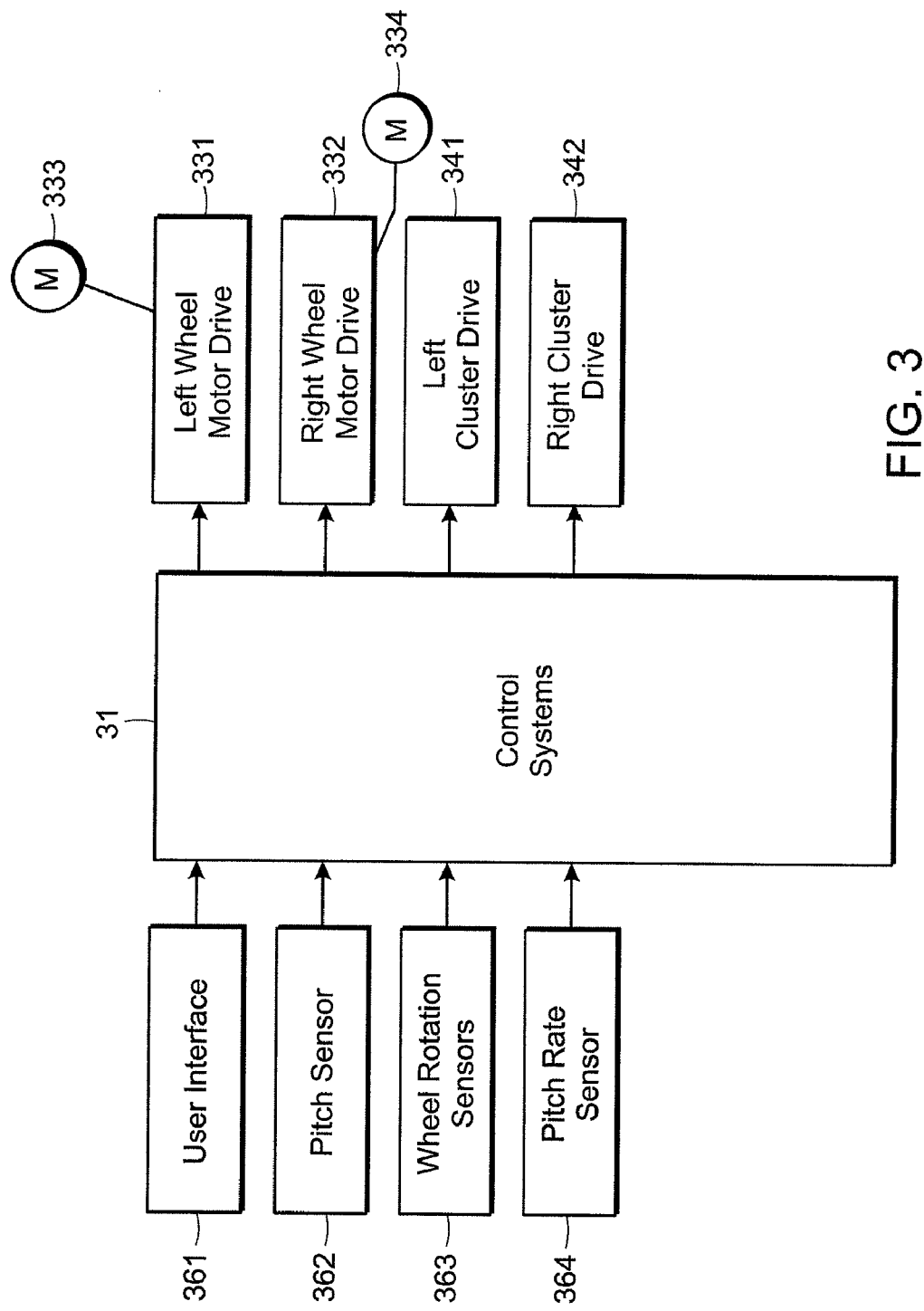
FIG. 3 is a block diagram showing sensors, power and control, according to an illustrative embodiment of the invention.

The block diagram of FIG. 3 shows a control system 31 for controlling a vehicle, according to an illustrative embodiment of the invention. In this embodiment of the invention, the control system 31 is used to control the motor drives and actuators of a vehicle, for example, the balancing transporter 10 of FIG. 1. Motor drives 331 and 332 control the left and right wheels of the transporter 10, respectively. The control system 31 has data inputs including user interface 361, pitch sensor 362 for sensing fore-aft pitch, wheel rotation sensors 363, and pitch rate sensor 364. Pitch rate and pitch may be derived through the use of various sensors (e.g., gyroscopes or inclinometers), alone or in combination. Control system 31 also may contain a balancing margin monitor (not shown) which combines information on current battery parameters with information on motor parameters to calculate a current speed limit of the transporter. The balancing margin monitor is used to ensure, for example, that sufficient battery current is available when transients (e.g., bumps) are experienced during use of the vehicle to maintain stability of the vehicle. If wheel clusters are present (as with respect to, for example, FIG. 2 of U.S. Pat. No. 6,874,591), left cluster drive 341 and right cluster drive 342 are used to drive the left and right clusters, respectively.

In other embodiments, the control system 31 may have more than two wheel motor drives. Additional wheel motor drives may be used for a vehicle with more than two wheels, as is shown in U.S. Pat. No. 6,874,591, FIG. 2, the entire disclosure of which is incorporated herein by reference.

Figure 17:
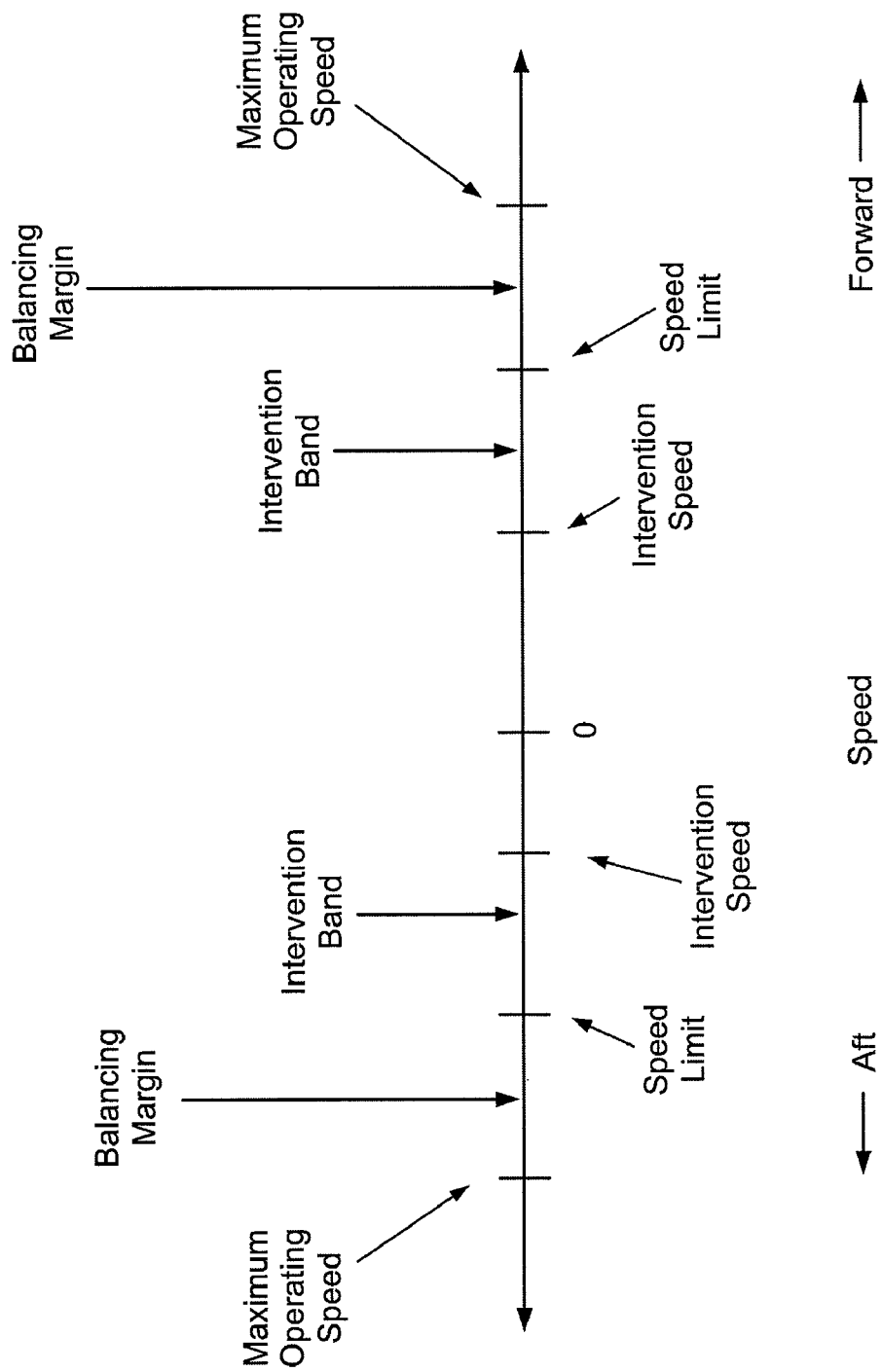
FIG. 17 illustrates the relationship among various speed limiting parameters for an exemplary balancing transporter.

In other embodiments, the control system 31 may limit the speed of the transporter to ensure that adequate speed reserve is available to maintain balance or to preserve a particular amount of acceleration or deceleration capability, as is discussed with respect to FIG. 17. It is desirable to preserve both torque and speed, the particular amount of which depends on many factors. The control system 31 may further contain logic to reduce the speed of the transporter to avoid damaging the battery due to generation of over voltage, as is discussed with respect to FIGS. 20-23. An over voltage condition can occur, for example, if the transporter is provided with capability to regenerate the battery during braking and when traveling downhill when the battery is already fully charged.

The term "lean," as used herein, refers to the angle with respect to the local vertical direction of a line that passes through the center of mass of the system and the center of rotation of a ground-contacting element supporting the system above the ground at a given moment. The term "system" refers to all mass caused to move due to motion of the ground-contacting elements with respect to the surface over which the vehicle is moving.

"Pitch state" as used herein includes both the pitch in the fore-aft plane and the pitch rate of the vehicle (i.e., $\theta$ and $\theta_r$ (or $\dot\theta$) where $\theta_r$ is the time rate of change of $\theta$).

One mechanism for providing user input for a yaw control system of a personal transporter is described in detail in U.S. Pat. No. 6,789,640. As described therein, a user mounted on a transporter may provide yaw control input to a yaw controller 402 (shown in FIG. 4) by rotating a yaw grip assembly.

Figure 4:
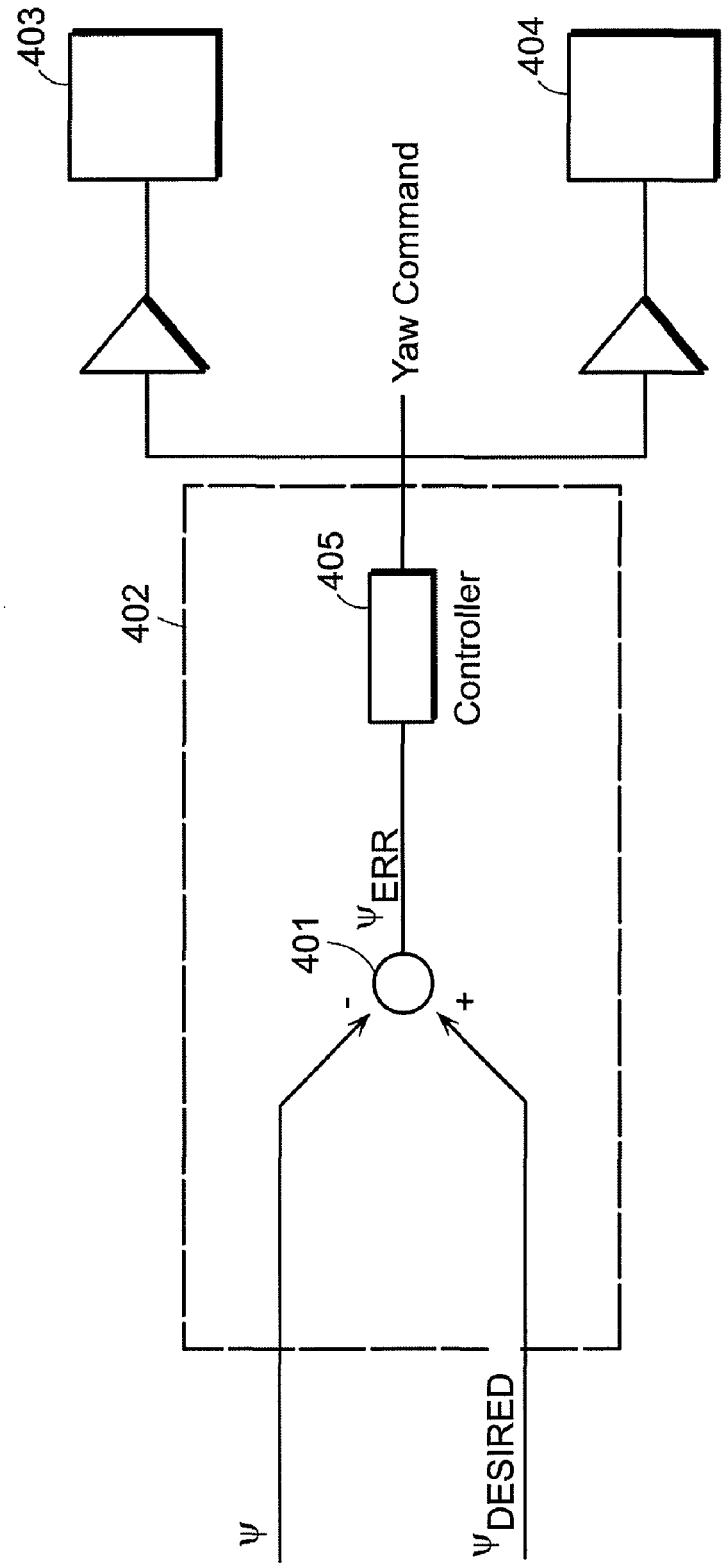
FIG. 4 shows a block diagram showing the constitutive inputs and outputs of a yaw command in a system architecture to which the present invention may be advantageously applied.

FIG. 4 depicts the differencing, in summer 401, of the current yaw value ψ with respect to the desired yaw value $\psi_{desired}$ to obtain the current yaw error $\omega_{err}$. Desired yaw value $\psi_{desired}$ is obtained from a user input, various embodiments of which are described, therein. The current value ψ of yaw is derived from various state estimates, such as the differential wheel velocities, inertial sensing, etc. Derivation of the yaw command from the yaw error is provided by motor controller 405 according to various processing algorithms described, for example, in U.S. Pat. No. 6,288,505, and applied to left and right motors 403 and 404, respectively.

One of the key properties of a good directional input device is its ability to provide directional input while managing lateral acceleration. High lateral acceleration turns require the user to lean into the turn to keep from falling off or tipping over the transporter. An optimal directional input device requires the user to have their body properly positioned when commanding a directional input. A twist grip yaw input, such as discussed above with reference to U.S. Pat. No. 6,789,640, encourages proper body positioning through the orientation of its rotation axis and the design of the knob and handle combination. It is possible, however, to make an uncoordinated input depending on the driver's technique.

Another method of encouraging proper body positioning is to make one or more handlebars into a joystick. By pivoting the bar near the base of the machine, the user can move his or her body at high speeds and merely hold onto the handlebar and command an input. When properly tuned, the user's body is already in position to react against the lateral acceleration at the initiation of the turn, reducing the likelihood of an improperly coordinated turn.

In the handlebar lean machine, the yaw input is proportional to the handlebar angle with respect to the chassis. Preferably, the pivot axis is mounted as low as practical on the transporter ground-contacting module in order to allow the bar motion to follow the user's body motion naturally, since a person leans most stably by pivoting at the ankles. In other words, a low pivot handlebar tracks the body kinematics. In this embodiment, the yaw input is converted into a yaw command using standard personal transporter algorithms, which apply a fixed gain to yaw input at low speeds, but scale the gain at higher speed to make the yaw input correspond to lateral acceleration instead of yaw rate. This works well with the handlebar lean device, since the desired lean angle is roughly proportional to lateral acceleration. The result is a very natural input method, where the user "thinks" right or left via leaning, and the machine follows.

$$\dot{\psi}_{cmd} = K(\Phi_{HB} - \Phi_{Roll}) \quad (EQN. 2)$$

where K is a constant;
$\Phi_{HB}$ is the handlebar angle with respect to the platform;
$\Phi_{Roll}$ is the platform lean with respect to gravity;
$\dot{\psi}_{cmd}$ is the yaw command.

Other embodiments of the invention may have an inclined or horizontally mounted pivot handlebar. In machines with inclined pivots, the angle of the pivot with respect to the contact patch and surface provide interesting turning dynamics. Specifically, the axis of rotation may affect the dynamics of turning on a slope or on a flat surface. Preferably, the machine has a low horizontal pivot. A horizontal pivot can easily track the kinematics of the body during a turn.

In accordance with yet other embodiments of the invention, with the direction of travel as the reference point, the pivoted handlebar may be either mounted in the front or the rear of the transporter. The configuration of a rear mounted pivot handlebar enables a user to steer the transporter with other parts of the body such as the knees, in addition to using a limb coupled to the handlebar. Furthermore, the transporter may include a feature that disables the lean steer when a user is mounting or dismounting. The feature may be activated when the transporter determines that a user is partially on/off the platform such that the transporter may not turn into or away from the user while mounting or dismounting.

Figures 5A, 5B:
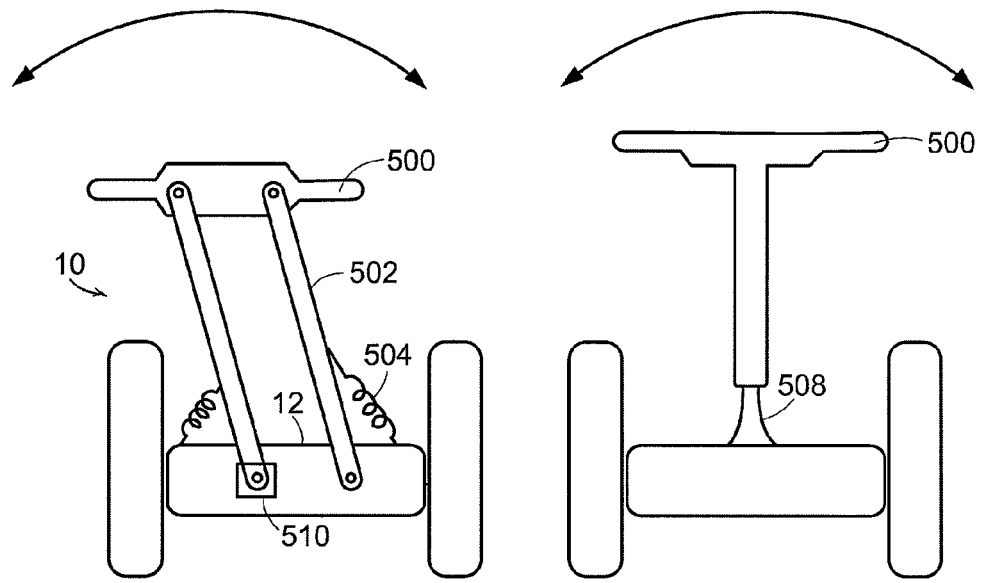
FIG. 5A shows a handlebar lean device for control input to a personal transporter in accordance with embodiments of the present invention.
FIG. 5B shows a handlebar lean device with flexure coupling of the control stalk to the ground-contacting module for control input to a personal transporter in accordance with embodiments of the present invention.

Of the various mechanisms suited to provide for handlebar lean, a first is described with reference to FIG. 5A. Motion of handlebar 500 is constrained to a plane that is substantially transverse to the direction of forward motion of personal transporter 10 by means of parallel link bars 502 that are pivotally coupled both to platform 12 and to handlebar 500. Motion of the handlebar may also be biased to a central position and/or damped by means of springs 504 or shock absorbers. In an alternate embodiment shown in FIG. 5B, handlebar 500 is coupled to platform 12 of the transporter 10 by flexure elements 508, again constraining motion of the handlebar substantially to a plane transverse to the direction of forward motion and allowing tilting of the handlebar in an arc centered upon a virtual pivot at, or near, the plane of platform 12. In either of the embodiments of FIGS. 5A and 5B, one or more sensors 510 detect the position of handlebar 500 or of members 502 coupling the handlebar to the transporter, either with respect to the vertical or with respect to a direction fixed with respect to the ground-contacting module. Sensor 510 may be a load cell, for example, disposed along a control shaft of the vehicle (e.g., handle 16 of FIG. 1). Furthermore, the springs or shock absorbers coupled to the handlebar may be used to limit the turning rate of the transporter if desired.

In one embodiment, the motion of the handlebar is not biased to a central position. In embodiments where the handlebar is not biased to a central position, there is no preloading around the center and thus a user can precisely and accurately steer the transporter.

Figure 5C:
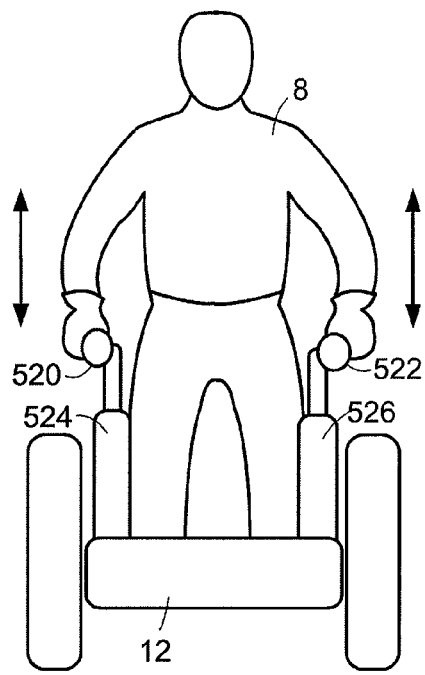
FIG. 5C shows a further handlebar lean device with separated handles for control input to a personal transporter in accordance with embodiments of the present invention.

In accordance with an embodiment depicted in FIG. 5C, two separate handlebar segments 520 and 522 may be moved separately, by leaning of the user 8, relative to platform 12 of the transporter. In the embodiment shown, the position of each handlebar segment is biased to a specified 'neutral' height within respective sleeves 524 and 526 by means of springs, or otherwise. A relative height offset is transmitted to the yaw controller to control turning, as described in connection with other user input modalities.

Figure 5D:
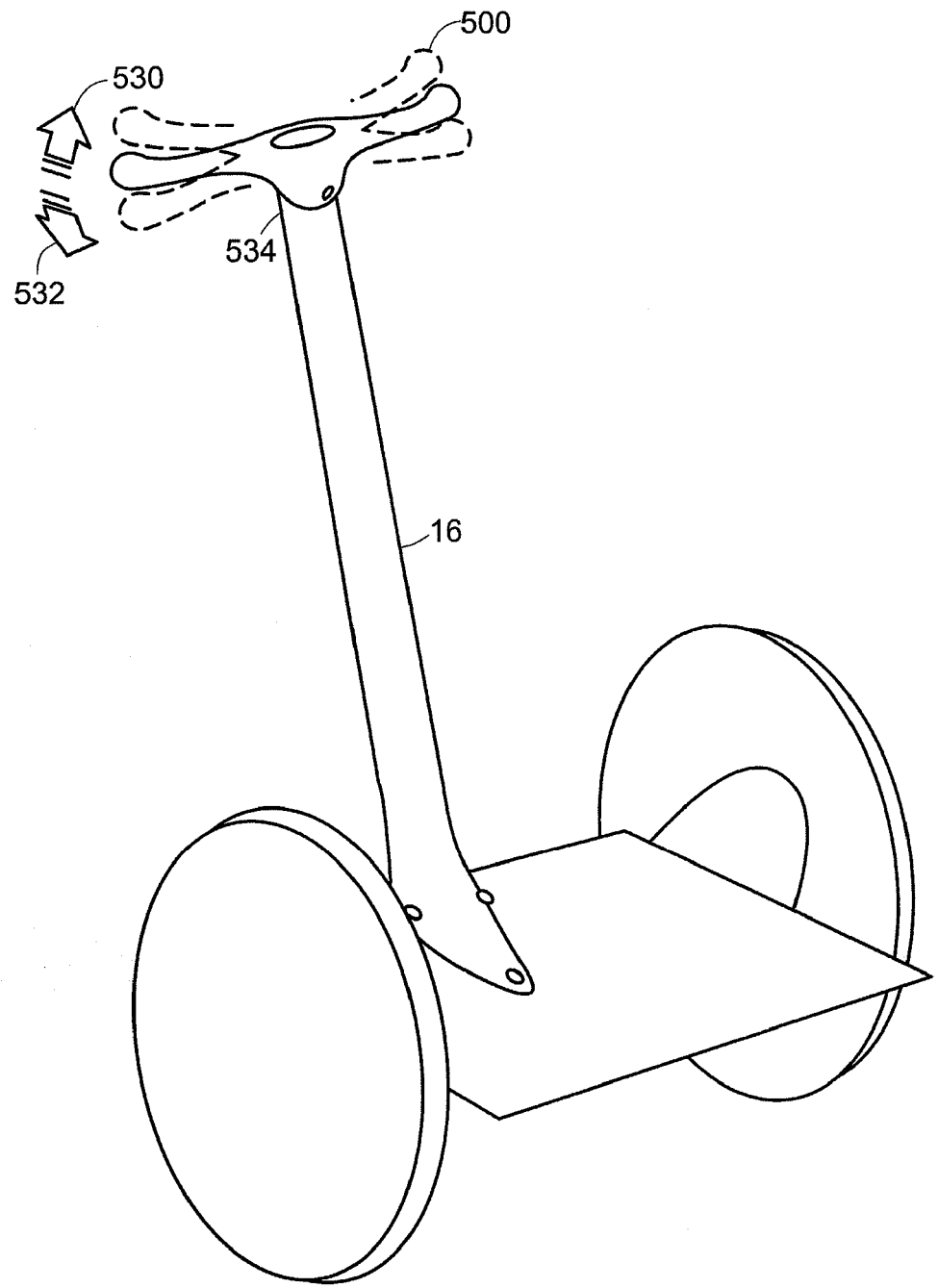
FIG. 5D shows a rotating handlebar device for control input to a personal transporter in accordance with embodiments of the present invention.

Yet a further embodiment of the invention is depicted in FIG. 5D, where rotation in clockwise and counterclockwise directions 530 and 532 of handlebar 500 relative to support stalk 16 is sensed to generate a signal that transmits a user input to a yaw controller (e.g., the yaw controller 402 of FIG. 4). A shock absorber 534 is preferably built in to the pivotal coupling of handlebar 500 about shaft 16.

One issue that must be addressed in handlebar lean control is the effect of terrain sensitivity. If the machine is driven over obstacles or rough terrain, a roll disturbance is forced on the machine/rider system since the resulting change in position of the user may cause an unintended yaw input into the system. Yaw control modalities that depend upon the overall body lean of a standing person are prone to be more sensitive to terrain than, say, yaw control by means of a twist grip.

To combat this roll sensitivity, a roll compensation algorithm may be employed. In such an algorithm, the yaw input is modified to compensate for the roll angle of the chassis, making the yaw input the angle of the handlebar with respect to gravity. Since it is easier for the user to maintain body position with respect to gravity rather than the platform, this facilitates rejection of roll disturbances.

In accordance with certain embodiments of the invention, a method for reducing terrain sensitivity employs an algorithm for filtering yaw inputs based on the roll rate of the chassis. The instantaneous rate of rolling, referred to as Roll Rate, is readily available from the Pitch State Estimator, such as that described, for example, in U.S. Pat. No. 6,332,103 (incorporated herein by reference), which derives the orientation of the transporter based on one or more gyroscopes, an inclinometer, or combinations of the above. Large roll transients cause the rider to be accelerated and, if the roll transients were to be rigidly coupled, through the rider, to the yaw control mechanism, they would cause unintended yaw input.

There are two distinct parts of the solution: rejecting terrain while riding straight and rejecting terrain while turning; the first is a special case of the second. While disabling yaw during periods of large roll rates would solve the problem for motion in a fixed direction, more input is required in order to decouple roll from steered motion.

An unknown input is an estimate of the "intended" yaw input from the user (e.g., the intention by the user to ride around in a 20' (6.1 m) diameter circle). While the intended yaw input information is not directly available, it can be usefully inferred from the history of the yaw input. Simply low-pass filtering the data provides an estimate of yaw input. However, this causes a response delay that is noticeable to the user. On the other hand, if low-pass filtered data are used only when high roll rates are present, the rider is less likely to notice the delay. The algorithm, then, in accordance with one embodiment of the invention, employs a mixer, controlled by roll rate, between direct yaw input and a heavily filtered version.

A transfer function models the amount of roll rate that couples into the yaw signal. It is a function of various factors, including the design of the yaw input, the rider's ability, and how the rider is holding on to the yaw input (e.g., the handle 16 of FIG. 1). By using this mixing method, the transfer function can largely be ignored or at most minimized through tuning.

Four main tuning points are: how fast the mixer slews to the filtered version, how fast the mixer slews back, at what threshold the mix starts and ends, and the corner frequency of the low pass filter (LPF) on yaw input. There are limits to the amount of uncommanded yaw that can be removed due to setting the mix threshold. By setting it high there is more uncommanded yaw, by setting it low there are more false trips and the rider begins to notice the time lag on the yaw signal. Setting the LPF frequency also has tradeoffs. If yaw is too heavily filtered, then there is a noticeable delay and a possibility of yaw transients coupling in from the past. Setting it too low reduces the ability of the mixer to remove the transients.

Figure 6:
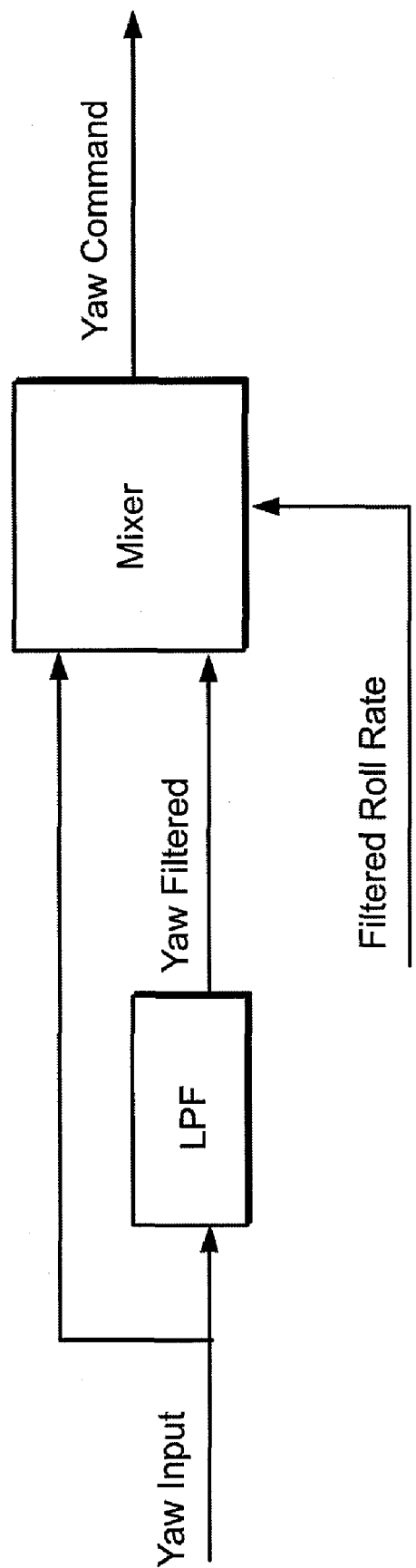
FIG. 6 is a block schematic of a mixer block for combining yaw input and roll information in accordance with embodiments of the present invention.

Referring now to FIG. 6, the mixer block is defined as:

$$\text{yaw command} = F*\text{Yaw Input} + (1-F)*\text{Yaw Filtered}, \quad \text{(EQN. 3)}$$

where F is the mixer function which is a continuously varying signal between 0.0 and 1.0. Low pass filtering of the sensed roll rate (Filtered Roll Rate) is advantageously provided in order that travel over a rough surface does not result in erratic yaw response.

Figure 7:
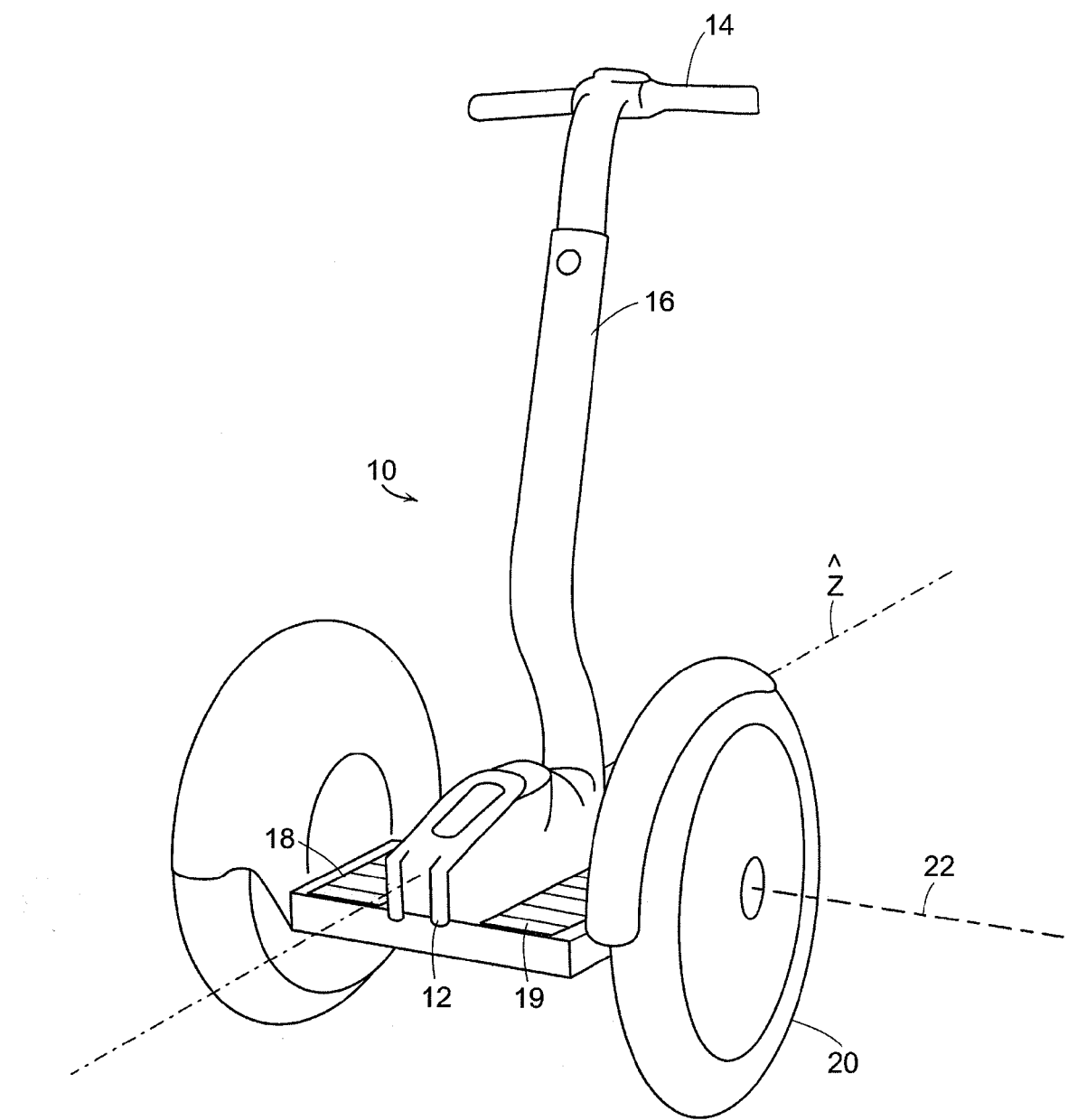
FIG. 7 shows a personal transporter, in accordance with an embodiment of the present invention.

FIG. 7 shows a personal balancing transporter in accordance with embodiments of the present invention and designated generally by numeral 10. Prior balancing personal transporters have been described in detail, for example, in U.S. Pat. No. 6,302,230, which is incorporated herein by reference. A subject (not shown) stands on a support platform 12 and holds a grip 14 on a handle 16 attached to the platform 12. The transporter 10 includes at least one ground-contacting element, wheels 20 in this embodiment of the invention. The transporter 10 also includes at least one actuator (not shown) located in the platform 12 that applies torque to the ground-contacting element for propelling the transporter with respect to a surface.

Handle 16 may also be referred to as a "steering column," "member" or "stalk," which terms are used interchangeably herein. In this embodiment of the invention, support platform 12 includes separate left foot plate 18 and right foot plate 19, as further discussed below.

A control loop is provided so that forward or backward leaning of the subject results in the application of torque to wheels 20 about axis 22 by means of a motor drive (not shown) as discussed herein, thereby causing an acceleration of the transporter 10. The control loop is implemented with a controller (not shown) located on, or in, the transporter 10. The controller includes at least one processor and inputs and outputs for controlling operation of the transporter 10. Transporter 10, however, is statically unstable, and, absent operation of the control loop to maintain dynamic stability, transporter 10 is unable to operate in its typical operating orientation.

Figure 8:
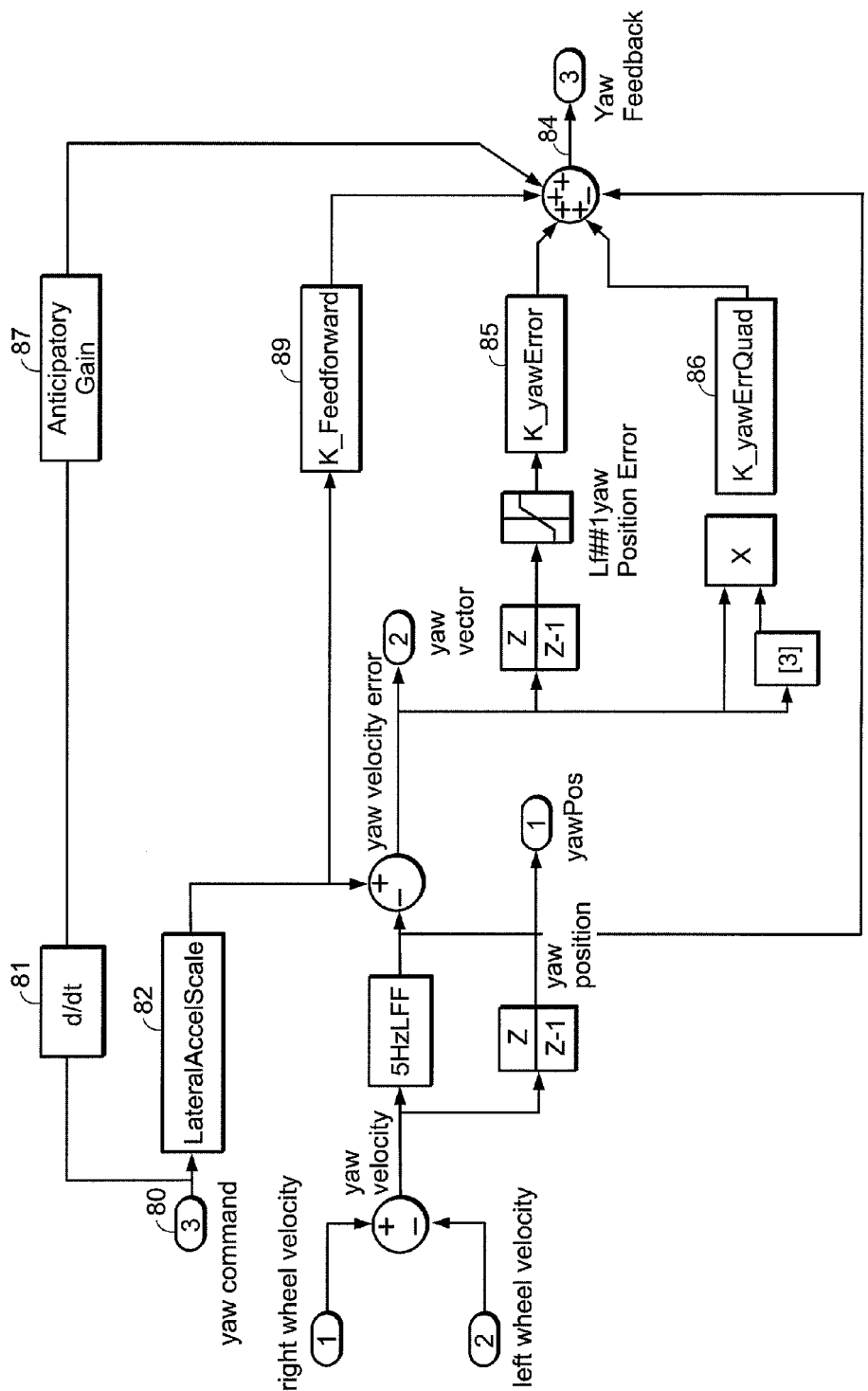
FIG. 8 shows a schematic block diagram of a yaw control system in accordance with various embodiments of the present invention.

FIG. 8 shows a block diagram of a yaw feedback control system, according to an embodiment of the invention. Yaw input 80 is derived from a user interface, as discussed below. One preferred user input is provided by the position of a member, exemplified by handle 16 (shown in FIG. 7), about a fiducial pivot axis denoted $\hat{z}$.

It is to be understood that while, in one preferred embodiment, the user who provides yaw input is the rider aboard the personal transporter, the invention is not to be limited in that regard. For example, in one alternative embodiment, yaw input is provided by a user changing the position of the handle 16 while walking alongside, or in front of, the transporter 10.

The LateralAccelScale function 82 reduces the effect of the yaw input 80 at higher wheel speeds and at higher centripetal acceleration. Feedback 84, used to regulate the commanded yaw velocity, contains a yaw position term 85 to maintain yaw position, a velocity squared term 86 that attempts to regulate the yaw velocity to zero, and a feedforward term 89 used to provide better yaw command response to the user.

Feedforward term 89 dominates for rapid maneuvers in order to provide a responsive system. The velocity-squared feedback 86 is an example of deviation from linear control theory and has the effect of providing nonlinear yaw velocity damping.

The rate of change in a variable associated with yaw input (such as the handle bar angle about fiducial axis $\hat{z}$, typically the transporter roll axis, as discussed below) may also be employed as an additional yaw command, and may be derived by means of differentiator 81. The rate of change of the yaw input variable 80 creates a component of the yaw command which "anticipates" the rider lean and is more likely to keep the handle 16 coordinated with the rider and makes the transporter 10 feel more responsive.

The gain 87 associated with the rate-of-change component of the yaw input may be varied, for example, on the basis of the level of experience of the user. In this manner, the yaw command signal is generated based on the position of the handle 16 and the rate of change of the position of the handle 16 which is weighted based on the level of experience of the user. In one embodiment, the value of the gain 87 for an expert is set to be 130% of the value associated with a beginner. Different gain values can be implemented in alternative embodiments of the invention. In some embodiments, the transporter can be configured to allow a user to set multiple levels of experience.

In some embodiments, the rate of change of the position of the handle 16 which is weighted in response to the user selecting or specifying a user proficiency or experience level by, for example, toggling among beginner, intermediate and expert modes of the transporter 10. Each mode can impose a different, specified operational constraint on the transporter 10. In some embodiments, the user selects the mode through use of controls or buttons located on the transporter 10. In some embodiments, the user selects the mode through use of buttons located on a control device (not shown). In some embodiments, the rate of change of the position of the handle 16 is weighted to reduce its effect on the yaw command signal for a beginner user. In some embodiments, the rate of change of the position of the handle 16 is weighted to increase its effect on the yaw command signal for an experienced user. Thus, for beginners, the rate-of-change term is advantageously reduced or eliminated, with the yaw command being based predominantly, or solely, on the yaw input variable, such as the angle of the handlebar about the fiducial axis $\hat{z}$.

Moreover, the rate-of-change component may be filtered with respect to frequency, such that the yaw command may be tailored to be more responsive to sudden maneuvers executed by more experienced riders and more forgiving of sudden maneuvers executed by less capable riders.

In some embodiments, the experience level of the user is used to provide different operating characteristics for a transporter depending on whether the user is a beginner or an expert. In this manner, the low speed sensitivity and maximum commanded yaw rate can be reduced for a beginner mode while preserving the steady-state operation of a transporter that the transporter would operate in for an expert mode.

Further, in some embodiments of the invention, different control gains are used to control operation of the transporter for a beginner mode versus an expert mode when, for example, operating the transporter in reverse and/or during mounting and dismounting of the platform of the transporter.

Several alternative modalities for specifying user directional or velocity input are described in U.S. patent application Ser. No. 10/939,955, which has been incorporated herein by reference. A preferred technique for receiving yaw command input on the basis of handlebar lean is discussed herein, and several embodiments for implementing handlebar lean are depicted in FIGS. 5A-5D.

In the handlebar lean modality, in some embodiments, the yaw input is proportional to some function of the handlebar angle with respect to the chassis, where that functional dependence may be changed on the basis of specified operational circumstances. Alternatively, the yaw input may be proportional to some function of the handlebar angle with respect to a device-independent frame, such as with respect to the local Earth/inertial frame of reference (i.e., to the local vertical—the local gravity vector).

Figure 9:
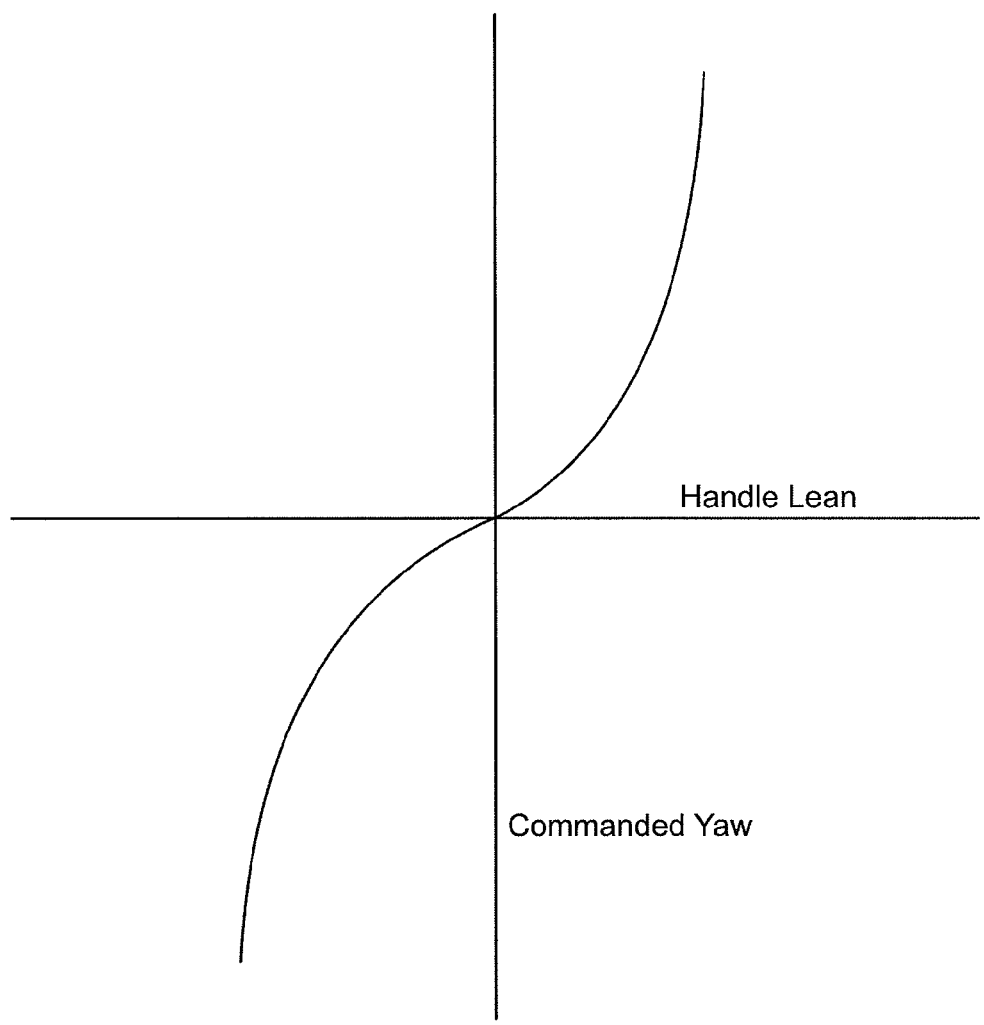
FIG. 9 shows a functional relationship of commanded yaw to handle tilt, in accordance with an embodiment of the invention.

A preferred relation of handle tilt to commanded yaw is shown in FIG. 9. In the relation shown, the commanded yaw increases more rapidly than linearly with respect to angular displacement (tilt) of handle 16 about pivot axis $\hat{z}$.

Figure 10:
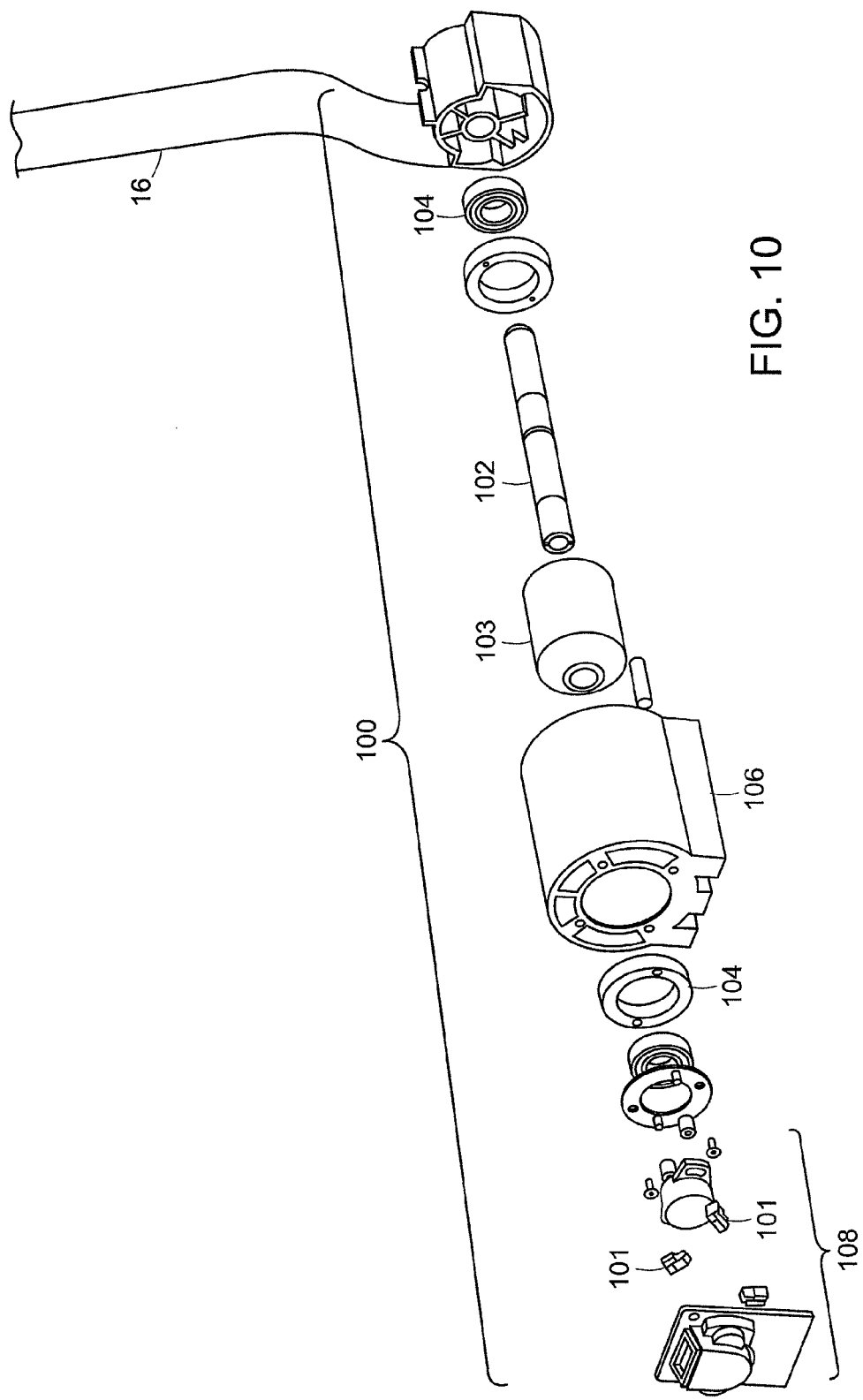
FIG. 10 is an exploded view of a handle lean pivot, in accordance with an embodiment of the present invention.

Referring again to FIG. 7, alternative embodiments of the invention are now described in which the user provides yaw input by rotation of handle 16 about pivot axis $\hat{z}$, where the pivot axis is the roll axis of the transporter 10 such that handle rotation is in a lateral plane with respect to transporter forward motion. An exploded view of a pivot assembly 100, about which handle 16 is rotated is shown in FIG. 10.

Shaft 102 is aligned along the pivot axis $\hat{z}$ (see, FIG. 7). Shaft 102 passes through the bearing assemblies 104 and is supported by the bearing assemblies 104 such that the shaft 102 is capable of rotating about the pivot axis $\hat{z}$ with respect to base extrusion 106 and torsional bushing 103. Base 106 is coupled to platform 12 of the transporter 10 of FIG. 7.

The orientation of shaft 102, and, thus, of handle 16, is sensed by pivot angle sensor assembly 118 which contains redundant sensors 101, which may be any sensors known in the art for sensing rotation (e.g., Hall-effect sensors). Other sensors (e.g., optical sensors or magnetic sensors) may also be employed are therefore within the scope of the present invention.

Any mechanism for providing a force that opposes an increasing yaw command, and that restores the yaw input to its central position is within the scope of the invention. One preferred embodiment includes the constant-stress torsional bushing 113.

Figure 11:
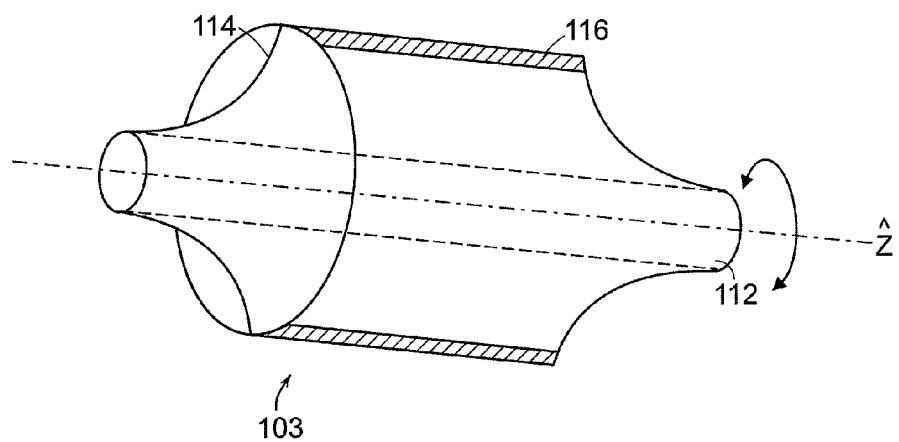
FIG. 11 shows a view of a constant-stress torsional bushing for providing a centering torque to the handle about the handle lean pivot, in accordance with an embodiment of the present invention.

Torsional bushing 103 is shown in greater detail in FIG. 11. An elastomeric membrane 114 is rigidly coupled to shaft 112 and to cowling 116 that is fixed with respect to platform 12 such that a restorative torsional force is exerted on shaft 112 by virtue of the shear component of the elastic tensor characterizing the membrane when shaft 112 is rotated (about the $\hat{z}$ axis) concentrically with respect to cowling 116. The restoring torque is symmetrical with respect to left/right rotation of the shaft 112. The length over which elastomeric membrane 114 is coupled to the shaft 112 exceeds the length over which the membrane 114 is coupled to cowling 116 to maintain a substantially equal shear stress per unit cross sectional area of the membrane, thereby advantageously increasing the durability and lifetime of the membrane 114. The membrane 114 may be uniform in thickness or tapered.

Figure 12:
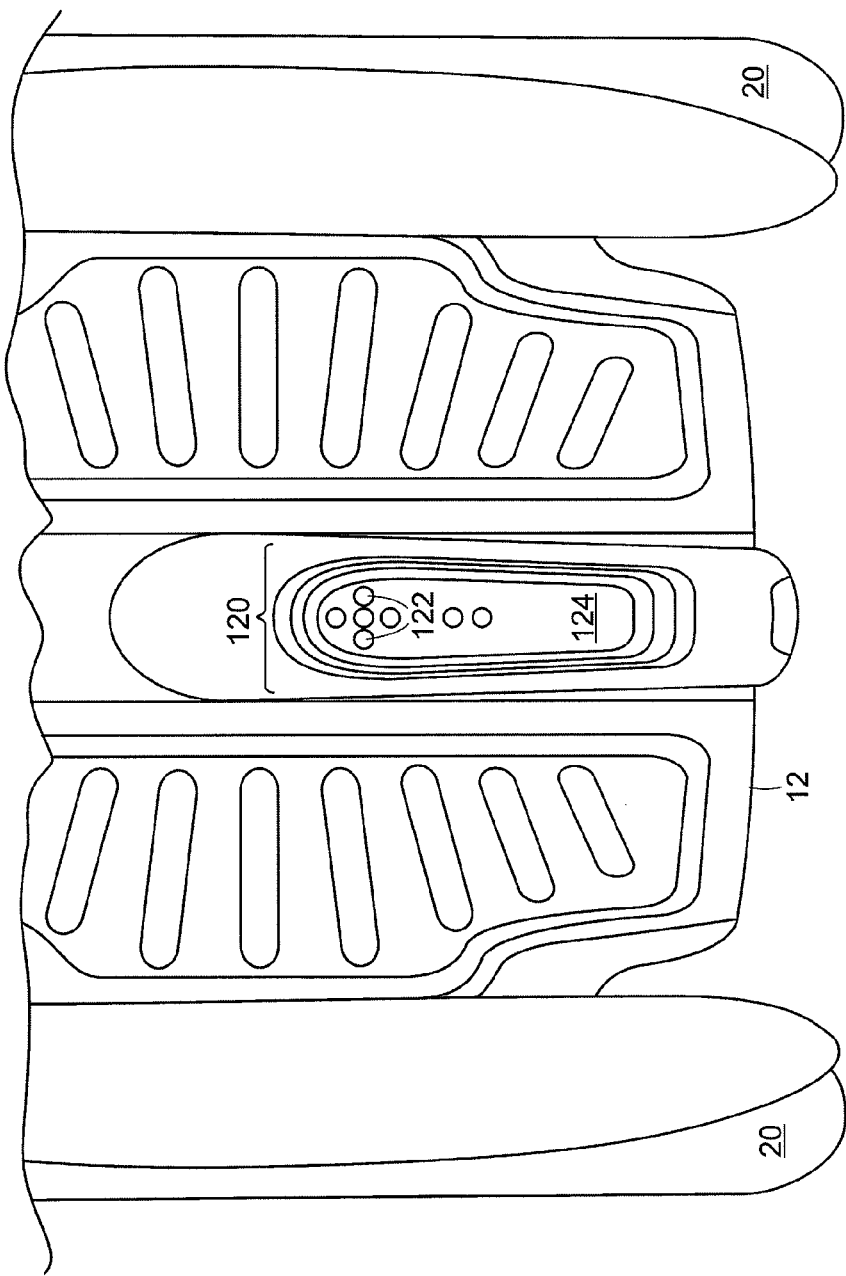
FIG. 12 is a top view of digital level for use with a human transporter in accordance with an embodiment of the present invention.

FIG. 12 is a top view of a digital level 120 used with a transporter (e.g., the transporter 10 of FIG. 7). Insofar as tilt of the transporter is an input to the control loop resulting in the application of torque to wheels 20, it is advantageous that the transporter be disposed in a substantially upright position, and thus in a zero-torque state, during the process of a rider mounting the transporter.

An array of five lights 122 (e.g., light emitting diodes (LEDs)), is provided, preferably on a console 124 disposed in a fixed position relative to platform 12 (between transversely disposed wheels 20) so as to be readily viewable by a rider either mounted on, or mounting, the transporter. In one embodiment, when the colors displayed by the LEDs are all illuminated in a single color (e.g., green), it is indicative of the platform 12 being level and in a correct orientation for mounting. Illumination of an LED in another color (e.g., red) indicates a tilt in the direction corresponding to that LED.

The lights of the digital level 120 may also be employed to indicate other states of the transporter. For example, a condition of blinking red lights may indicate an alarm condition such as a fault, requiring deceleration and dismounting. In some embodiments, blinking lights are representative of a condition involving unauthorized use of the transporter.

Figure 13A:
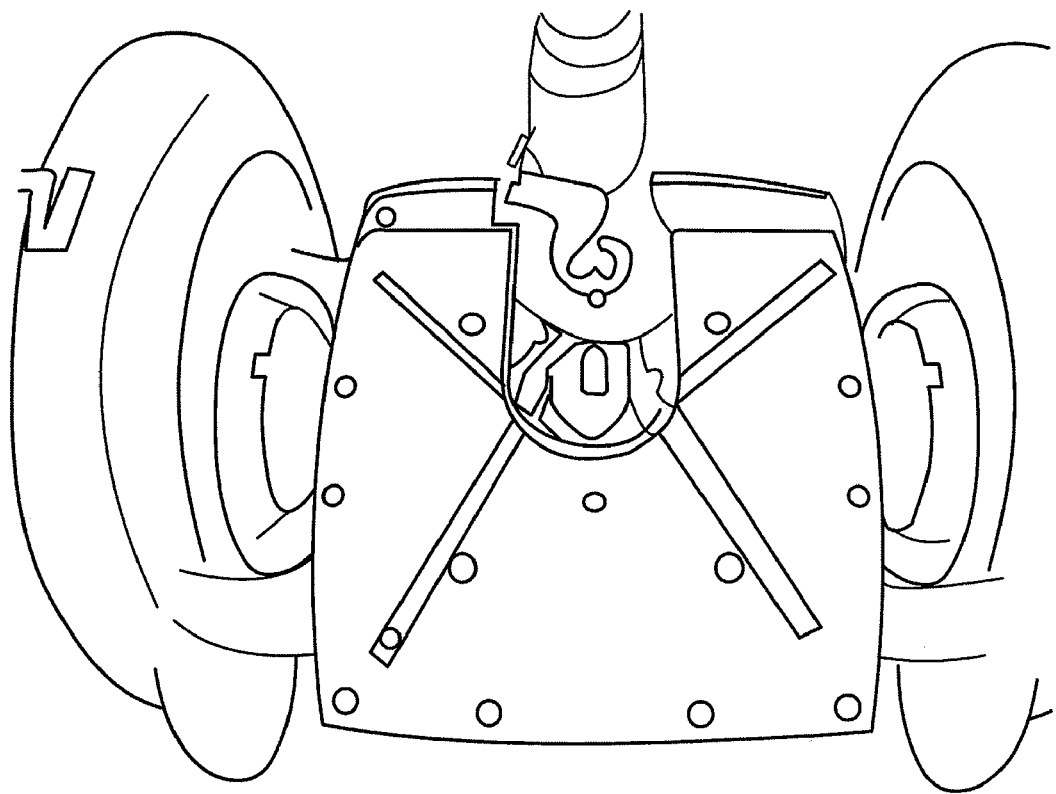
FIG. 13A is a top view of the platform of a personal transporter with the pressure plate removed, indicating the placement of feet-force pressure sensors in accordance with various embodiments of the present invention.
Figure 13B:
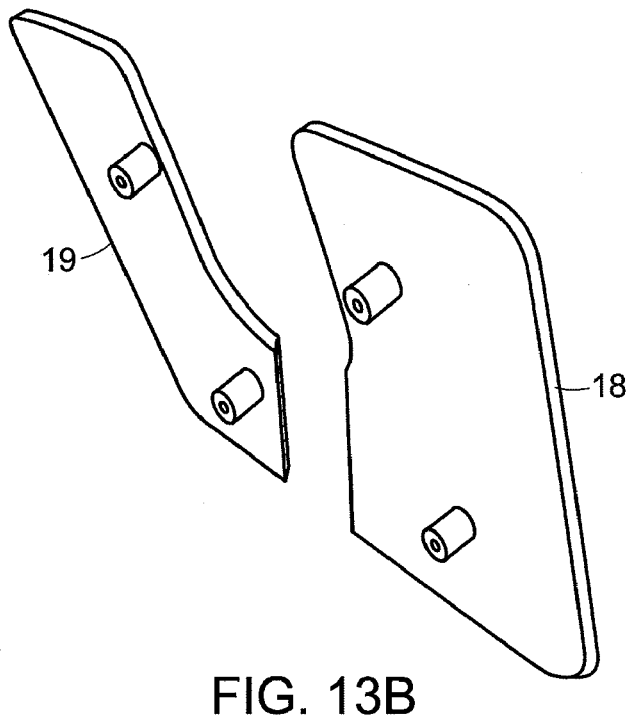
FIG. 13B shows two foot plates for detection of placement of rider's left and right foot in embodiments of the present invention.

In accordance with another embodiment of the invention, separate plates 18 and 19 (shown in FIG. 7) are provided to sense the weight of a user's left and right foot, respectively. FIGS. 13A and 13B are illustrations of a platform and plates (for example, platform 12 and plates 18 and 19 of FIG. 7). FIG. 13A is a top view of the platform of the transporter with the pressure plates removed, illustrating the placement of the feet-force pressure sensors, according to an illustrative embodiment of the invention. FIG. 13B is an isometric view of the two plates 18 and 19 for detecting placement of the user's left and right foot.

The use of plates 18 and 19 may be advantageously employed to control or limit turning of the transporter during the process of mounting or dismounting the transporter, as a matter of, for example, convenience and safety. For example, sensitivity of the control used to operate the transporter (e.g., the transport 10 of FIG. 3) in steering the transporter may be limited in cases where the rider has only a single foot on the platform. Table 1 specifies steering behavior of a transporter based on whether one or both feet of the user are on the transporter platform (e.g., the plates 18 and 19 of platform 12 of FIG. 7) in accordance with an embodiment of the invention. The steering behavior also is based on the operating speed of the transporter.

TABLE 1

Steering Behavior

| Rider Detect | Speed | Machine Response |
| --- | --- | --- |
| Left foot only on the transporter | Low speed (≦3 mph/1.34 meters/second) | Limit total yaw motion to left and emit alert sound when yaw command is ignored. |
| Right foot only on the transporter | Low speed (≦3 mph/1.34 meters/second) | Limit total yaw motion to right and emit alert sound when yaw command is ignored. |
| Left foot only on the transporter | Moderate-full (12.5 mph/5.59 meters/second) | Maintain yaw control but set speed limit to moderate (5 mph/2.24 meters/second). |
| Right foot only on the transporter | Moderate-full (12.5 mph/5.59 meters/second) | Maintain yaw control but set speed limit to moderate (5 mph/2.24 meters/second). |
| Both feet on the transporter | All speeds | Normal operation. |

Alternative steering behavior can be specified in alternative embodiments of the invention. For example, alternative transporter speeds can be specified. Further, steering behavior can be changed based on the amount of force applied by a user to one, or both, of the plates 18 and 19. In some embodiments, the experience level of the user (similarly as discussed herein) is a factor that is used to specify the steering behavior of the transporter.

In some embodiments of the invention, transporter (e.g., transporter 10 of FIG. 7) is provided with the capability of wireless control and of wireless telemetry of data via, for example, a telemetry unit. The wireless control and wireless telemetry of data can be provided unilaterally or bilaterally. In some embodiments, a remote input device is provided that may be carried by a user or may be disposed either on the transporter or at a remote location. In one embodiment, the transporter 10 includes a transceiver that establishes wireless remote communications between the input device and the controller of the transporter 10. The capability to control certain functions wirelessly, advantageously enables manufacture of transporter 10 with all the electronics contained entirely beneath platform 12, and, more particularly, with a control stalk 16 bearing no electronics.

In various embodiments of the invention, fore-aft stability may be achieved by providing a control loop (e.g., as discussed above in FIG. 2). The control loop may be used when one or more motors are included for operation of a motorized drive in connection with ground-contacting members. A pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain, when the transporter is not in locomotion, the center of mass of the transporter above the region of contact of the ground-contacting members with the ground, regardless of disturbances and forces operative on the transporter. In other embodiments, the ground-contacting members are driven by the motorized drive in the control loop to maintain the appropriate balance for an all terrain vehicle.

A ground-contacting member typically has a "point" (actually, a region) of contact or tangency with the surface over which a vehicle (e.g., transporter) is traveling or standing. Due to the compliance of the ground-contacting member, the "point" of contact is actually an area, where the region of contact may also be referred to as a contact patch. For example, the weight of a transporter is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

Figure 14:
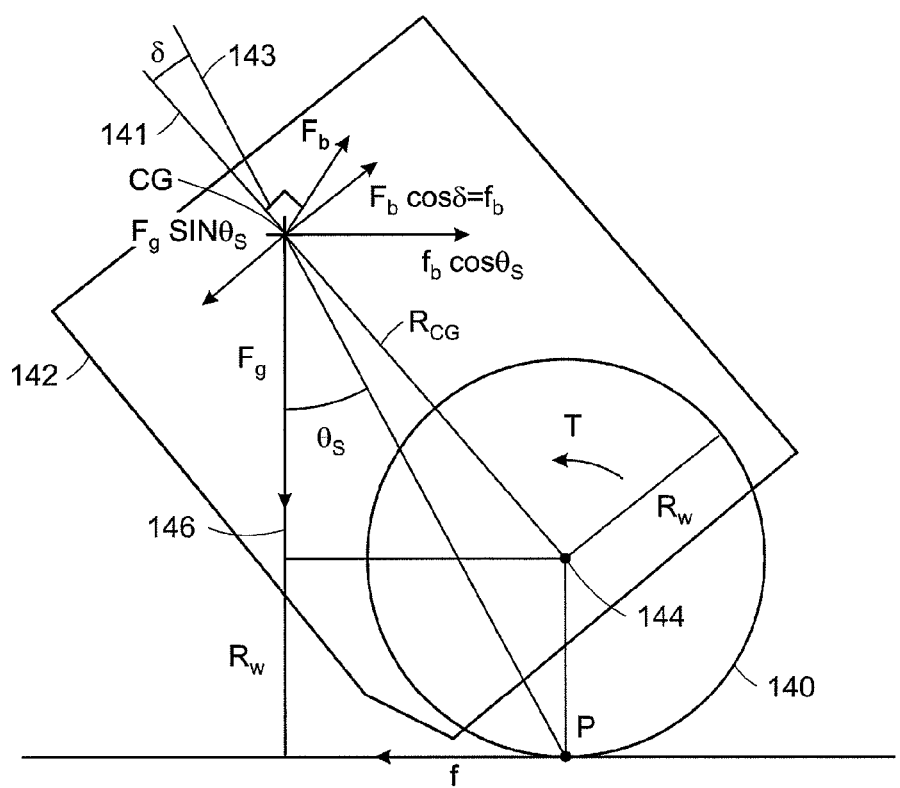
FIG. 14 is an illustrative diagram of an idealized balancing transporter with a rigid wheel in motion at a constant velocity across a flat surface.

A force in the direction of motion is required to overcome rolling friction (and other frictional forces, including air resistance). In some embodiments of the invention, gravity may be used to provide a torque about the point of contact with the surface in a direction having a component in the sense of desired motion. FIG. 14 shows the forces acting on a single wheel that travels with constant velocity v over a flat surface. The principles now discussed may readily be generalized to operation on a sloped surface and to accommodate any other external forces that might be present. Wheel 140 of radius $R_w$ rotates with respect to chassis 142 about axle 144 and contacts the underlying surface at point P. For illustrative purpose only, it is assumed that wheel 140 contacts the surface at a point.

The wheel is driven with respect to the transporter by a torque T (supplied by, for example, a motor) which in turn creates a reaction torque −T on the transporter. Since the torque acts about the axle 144, the reaction torque corresponds to a force $F_b$ acting at the center of gravity (CG) of the system, including the transporter and payload, where $F_b = T/R_{CG}$, where $R_{CG}$ is the distance between the axle and the CG of the system. The line 143 from the CG to point P is at an angle $\theta_s$ relative to the vertical 146.

The rolling friction, f, acting on the wheel at point P, is proportional to the velocity v of the rim of the wheel, with the proportionality expressed as $f = \mu v$. For constant velocity to be maintained, this force f must be exactly canceled. Consequently, with gravity providing the force, the condition that must be satisfied is:

$$F_b \cos \theta_s = f_b \quad \text{(EQN. 4)},$$

where $f_b$ is the component of the reaction force acting transverse to axis 141 between the CG and point P. In order to maintain stability (e.g., prevent a transporter from falling), a stability condition must also exist, namely that no net force acts on the CG in a direction transverse to line 143. There must be no net torque about the point of contact P during motion at constant velocity (i.e., in an inertial frame of reference where the point P is fixed). This condition may be expressed as:

$$F_g \sin \theta_s = f_b \quad \text{(EQN. 5)},$$

where $F_g \sin \theta_s$ is the "tipping" component of gravity, and $f_b$ is the counter-tipping component of the reactive force on a vehicle (e.g., transporter) caused by wheel rotation ($f_b = F_b \cos \delta$), and where $\delta$ is the angle shown between line 143 and line 141.

Equations 4 and 5 may be combined to yield $F_g \sin \theta_s \cos \theta_s = f = \mu v$, thus, in the limit of small angles (where $\sin \theta$ is approximately $\theta$), $$\theta_s = \left(\frac{\mu}{F_g}\right)^V, \qquad \text{(EQN. 6)}$$

showing that for a transporter, increasing velocity requires increased lean to overcome the effects of friction. Additionally, a control loop that imposes stability on the system will respond to an increased lean by increasing velocity of the system. Additional lean beyond that required to overcome the effects of friction results in acceleration since an additional forward-directed force acts on the CG of the vehicle. Conversely, in order to achieve acceleration (or deceleration) of the transporter, additional leaning (forward or backward) must be provided in a manner discussed in further detail below.

Figure 15:
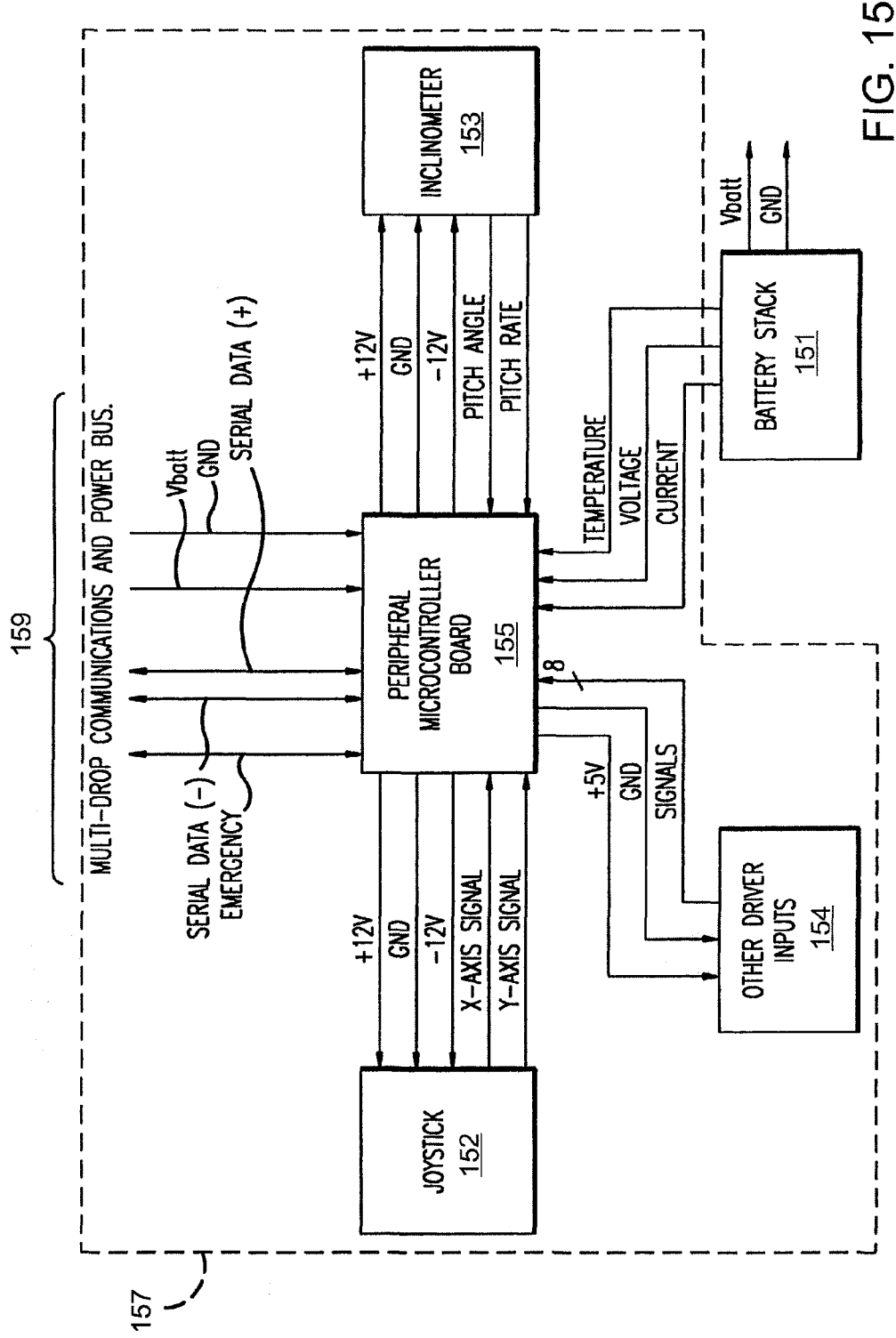
FIG. 15 is a block diagram providing detail of a drive interface assembly.

FIG. 15 is a block diagram providing detail of a wheel driver interface assembly 153. A peripheral microcomputer board 155 receives a user input from a joystick 152 as well as from an inclinometer 153. In other embodiments, the inclinometer 153 is another type of tilt sensor (e.g., pendulous reference sensor). The inclinometer 153 provides information signals of pitch ($\theta$) and pitch rate ($\theta_r$). To permit controlled banking into turns by a transporter, thereby increasing stability while turning, it is also feasible to utilize a second inclinometer to provide information as to roll ($\Phi$) and roll rate ($\Phi_r$). Alternatively, the resultant of system weight and centrifugal force may be used to increase stability while turning. The peripheral micro controller board 155 receives input signals from the battery stack 151, for example, battery voltage, battery current, and battery temperature. The peripheral micro controller board 155 also receives other driver inputs 154 (e.g., signals gated by switches (knobs and buttons) for platform adjustment and for determining the mode of operation). The peripheral micro controller board 155 is in communication over bus 159 with a central micro controller board (not shown) that may be used to control the wheel motors as described below in connection with FIG. 16.

Figure 16:
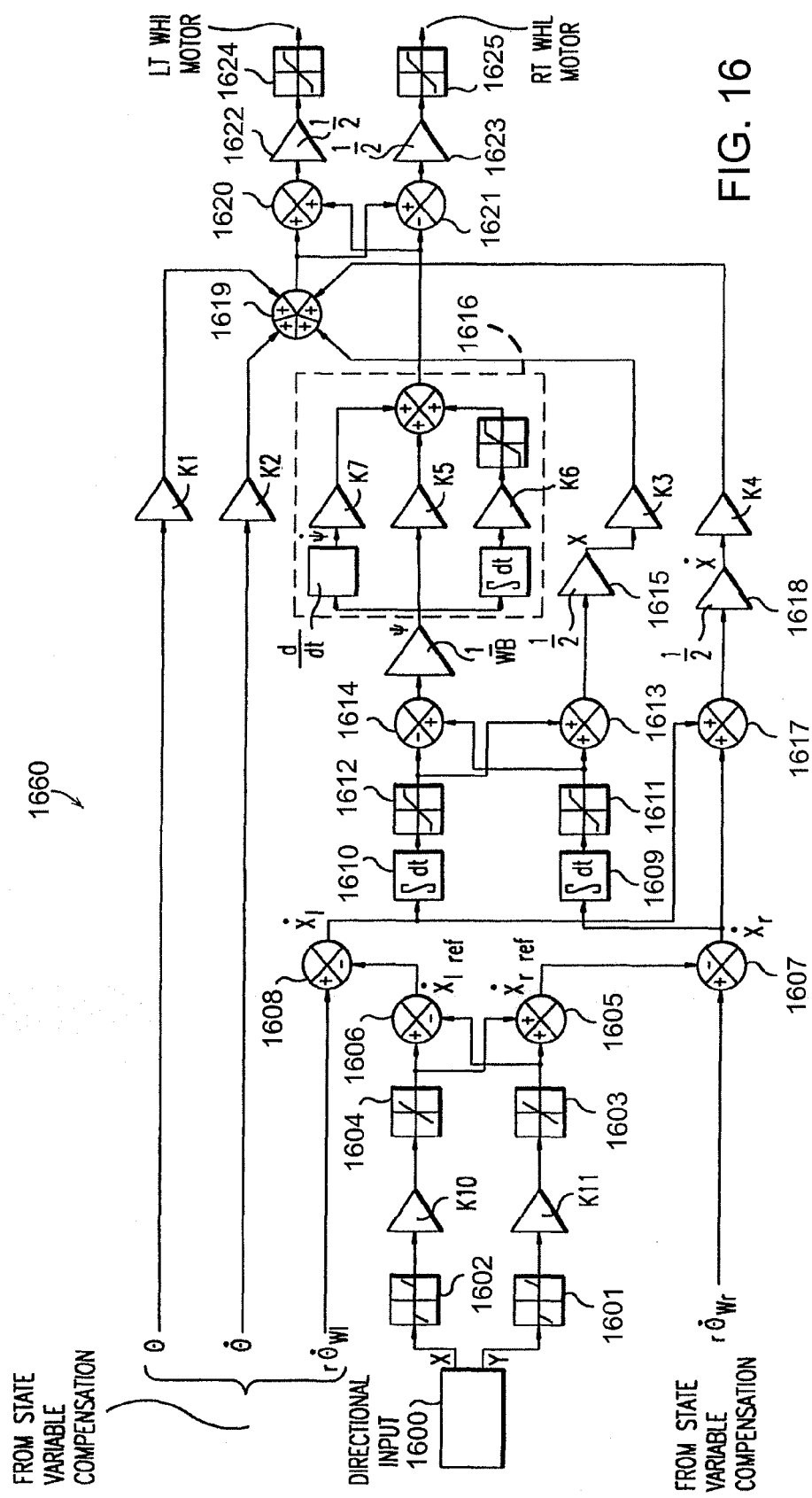
FIG. 16 is a schematic of the wheel motor control during balancing and normal locomotion, in accordance with an embodiment of the present invention.

FIG. 16 is a block diagram showing control algorithms suitable for use in conjunction with the control assemblies of FIG. 15 to provide stability for a transporter, e.g., the transporter 10 of FIG. 1, and other vehicles. Other embodiments include a transporter where the transporter and payload are balanced on two ground-contacting members, both during locomotion and in a fixed position. The following conventions are used in connection with the description below:
1. Variables defined in world coordinates are named using a single subscript in capital letters. World coordinates are coordinates fixed to the earth (inertial).
2. A non-subscripted r identifies a wheel radius.
3. Lower case subscripts are used to indicate other attributes, e.g., right/left, etc.: r=right; l=left; ref reference; f=finish; s=start.
4. All angles are positive in the clockwise direction, where positive travel is in the positive x direction.
5. A dot over a variable indicates differentiation in time, e.g., $\dot{\theta}$.

As shown, the control algorithms 1660 for motors of right and left wheels of a vehicle, for example wheels 20 and 21 of the transporter of FIG. 1. The control algorithms 1660 has inputs of linear velocity of the left wheel relative to the world coordinate system, $\dot{\theta}$, $r\dot{\theta}_{wl}$, and linear velocity of the right wheel, $r\dot{\theta}_{wr}$. The control algorithms 1660 also has directional inputs 1600 that are determined by a joystick positioned along the X and Y axes of a reference coordinate system. Inputs $\theta$, $\dot{\theta}$, and error signals x and $\dot{x}$ (described below) are subject to gains $K_1$, $K_2$, $K_3$, and $K_2$ respectively and become inputs to summer 1619. Summer 1619 produces the basic balancing torque command for the right and left wheels, as described above in connection with FIG. 2. The output of summer 1619 is combined with the output of yaw PID loop 1616 (described below) in summer 1620. The output of summer 1620 is divided in divider 1622. The output of summer 1620 is limited in saturation limiter 1624 producing a left wheel torque command. Similarly, the output of summer 1619 is combined with the output of PID loop 1616 in summer 1621. The output of summer 1621 is divided in divider 1623. The output of divider 1623 is limited in saturation limiter 1625 producing a right wheel torque command.

The control algorithms 1660 recognize that a directional input along the X axis moves the reference coordinate system, as shown in FIG. 1, along its X axis relative to the world coordinate system (which represents the traveled surface), at a velocity proportional to the displacement of a joystick. A directional input along the Y axis rotates the reference coordinate system, as shown in FIG. 1, about its Z axis at an angular velocity proportional to the displacement of the joystick. Motion of the joystick in the positive X direction is here interpreted to mean forward motion. Motion of the joystick in the negative X direction means reverse motion. Similarly, motion of the joystick in the positive Y direction means leftward turning, counter-clockwise as viewed from above. Motion of the joystick in the negative Y direction means rightward turning, clockwise as viewed from above. Hence the directional inputs Y and X are given deadband via deadband blocks 1601 and 1602 respectively, to widen the neutral position of the joystick. The outputs of 1601 and 1602 are subject to gains K11 and K10, respectively. The outputs of gains K11 and K10 are inputs to rate-limiters 1603 and 1604, respectively. Rate-limiters 1603 and 1604 limit the angular and linear accelerations, respectively, of the reference coordinate system. The rate-limited outputs from rate limiters 1603 and 1604 are inputs to summer 1605. The output of summer 1605 is the reference velocity $\dot{x}_{r\,ref}$ and the output of summer 1606 is the reference velocity $\dot{x}_{l\,ref}$. $\dot{x}_{r\,ref}$ and $\dot{x}_{l\,ref}$ are subtracted in summers 1608 and 1607 from compensated linear velocity input signals, $r\dot{\theta}_{wl}$ and $r\dot{\theta}_{wr}$ for left and right wheels to obtain velocity error signals $\dot{x}_l$ and $\dot{x}_r$ for left and right wheels within the reference coordinate system. The average of the velocity error signals $\dot{x}_l$ and $\dot{x}_r$, determined via summer 1617 and divider 1618, produces a linear velocity error signal. Displacement error signal x is derived by integrating $\dot{x}_l$ and $\dot{x}_r$ in integrators 1610 and 1609. The outputs of integrators 1610 and 1609 are inputs to saturation limiters 1612 and 1611. The output of saturation limiters 1612 and 1611 are averaged by summer 1613 and divider 1615. The difference between these displacements, determined via summer 1614, produces a yaw error signal, $\psi$.

The yaw error signal $\psi$ is input to a standard proportional-plus-integral-plus-derivative (PID) control loop 1616. The output of the PID control loop 1616 is combined with the output of the basic balancing torque command of summer 1619, to produce individual wheel torque commands. The individual wheel torque command causes the wheels to maintain fore-aft stability and also cause the transporter to align itself with the axes of, and follow the origin of, the reference coordinate system as directed by directional input 1600.

In a further embodiment of the invention, speed limiting is used to maintain balance and control, which may otherwise be lost if the ground contacting elements (e.g., wheels) were permitted to reach a maximum operating speed of a transporter. The term "maximum operating speed," as used herein, refers to the maximum speed at which the vehicle (e.g., transporter) is presently capable of being propelled. This maximum operating speed is typically a function of an instantaneous capability of the transporter. For example, the maximum operating speed may be a function of the capability of the drive system and/or the capability of the energy storage device provided to power the drive system. An energy storage device may be a battery. The "instantaneous capability" of the energy storage device is a measure of the instantaneous power that can be delivered by the device. The "maximum capability" of the energy storage device is a measure of the greatest power that the device can supply at any time. The terms "speed intervention band," "intervention speed," and "speed limit", as used herein, refer to a range or band of speeds extending from an "intervention speed" at the lower end to a "speed limit" at the upper end. The intervention speed is a threshold speed at which means may be employed to reduce a transporter's speed. A transporter will typically be operated with a margin between the maximum operating speed and the speed limit, as illustrated in FIG. 17. This margin helps ensure that the transporter maintains balance over a range of operating conditions.

Speed reduction may be accomplished by pitching the transporter back in the direction opposite from the current direction of travel, which causes the transporter to slow down. (As discussed above, the extent and direction of system lean determine the transporter's acceleration.) In this embodiment, the transporter is pitched back by adding a pitch modification to the inclinometer pitch value. Speed reduction can occur whenever the velocity of the transporter exceeds the intervention speed. The pitch modification is determined by looking at the difference between the transporter velocity and the intervention speed, integrated over time. The automatic pitch modification sequence may be maintained until the transporter slows to the desired dropout speed (some speed below the intervention speed), and the pitch angle may then be smoothly returned to its original value.

An electric motor connected to a wheel that supports a payload exerts some effort to maintain a steady-state condition. For a stationary vehicle on a slope, the electrical power source supplies the effort via the motor. When the machine begins traveling on the slope, speed increases as potential energy is converted into kinetic energy. Once a steady-state speed is reached, potential energy is no longer being converted to kinetic energy and there is no increase in velocity. Rather, the potential energy can be converted to electrical energy via the motor. The potential energy is converted to electrical energy, minus any losses in the system. The electrical energy can, for example, charge a battery used to drive the motor.

Figure 18A:
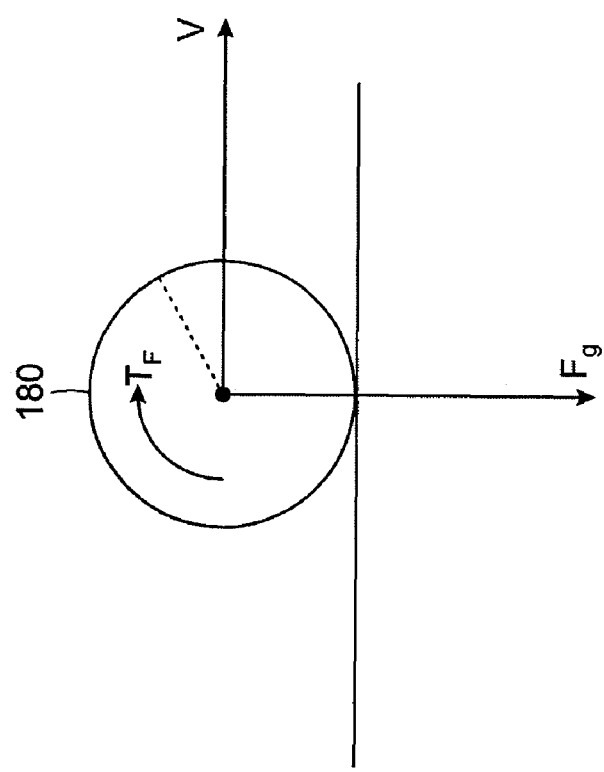
FIG. 18A is an illustrative diagram of an idealized wheel in motion at a constant velocity along a zero sloped surface.
Figure 18B:
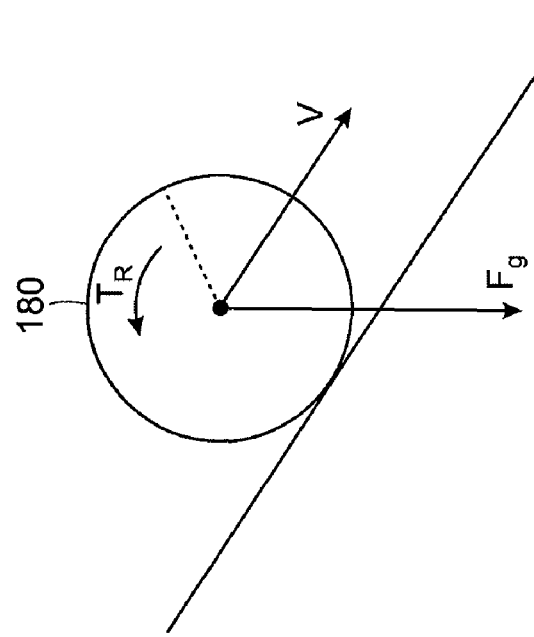
FIG. 18B is an illustrative diagram of an idealized wheel in motion at a constant velocity along a negatively sloped surface.

Motor current is proportional to the weight of the combination of the vehicle and supported payload and slope of an underlying surface. Together these two parameters determine how much work gravity can do on the system. If the surface slope is zero, gravity can do no work. FIG. 18A shows a wheel 180 traveling on a zero sloped surface. A forward torque, $T_F$, must be applied to the wheel 180 for the wheel to travel in a forward direction, V. The force of gravity, $F_g$, does not contribute to or reduce the amount of work required to propel the wheel 180 forward on the zero sloped surface. FIG. 18B shows a wheel 180 traveling down a sloped surface (slope a). The force of gravity, $F_g$, contributes to the amount of work required to propel the wheel forward, V. Because the wheel 180 is traveling down the sloped surface, a reverse torque, $T_r$, proportional to the force of gravity, ($F_g$), and the desired constant speed must be applied to maintain the wheel 180 traveling at a constant speed. In other embodiments, the wheel 180 may be traveling up hill. Other forces, (e.g., frictional forces) contribute to the amount of torque, T, required for propelling the wheel forward, as is discussed above with FIG. 14. For the purpose of simplification, they have been ignored in the above discussion. For a given surface slope, the greater the weight of the vehicle and payload, the more work gravity can do on the system, in the form of creating more current when accelerating or decelerating. The amount of current generated when accelerating or decelerating is reduced by rotating losses so that for small slopes or light payloads there may be no motoring or regeneration.

A given actuator system is typically limited in the amount of electric current that can be handled. Considerations such as motor drive hardware, battery capacity and thermal constraints affect this limit.

Figure 19:
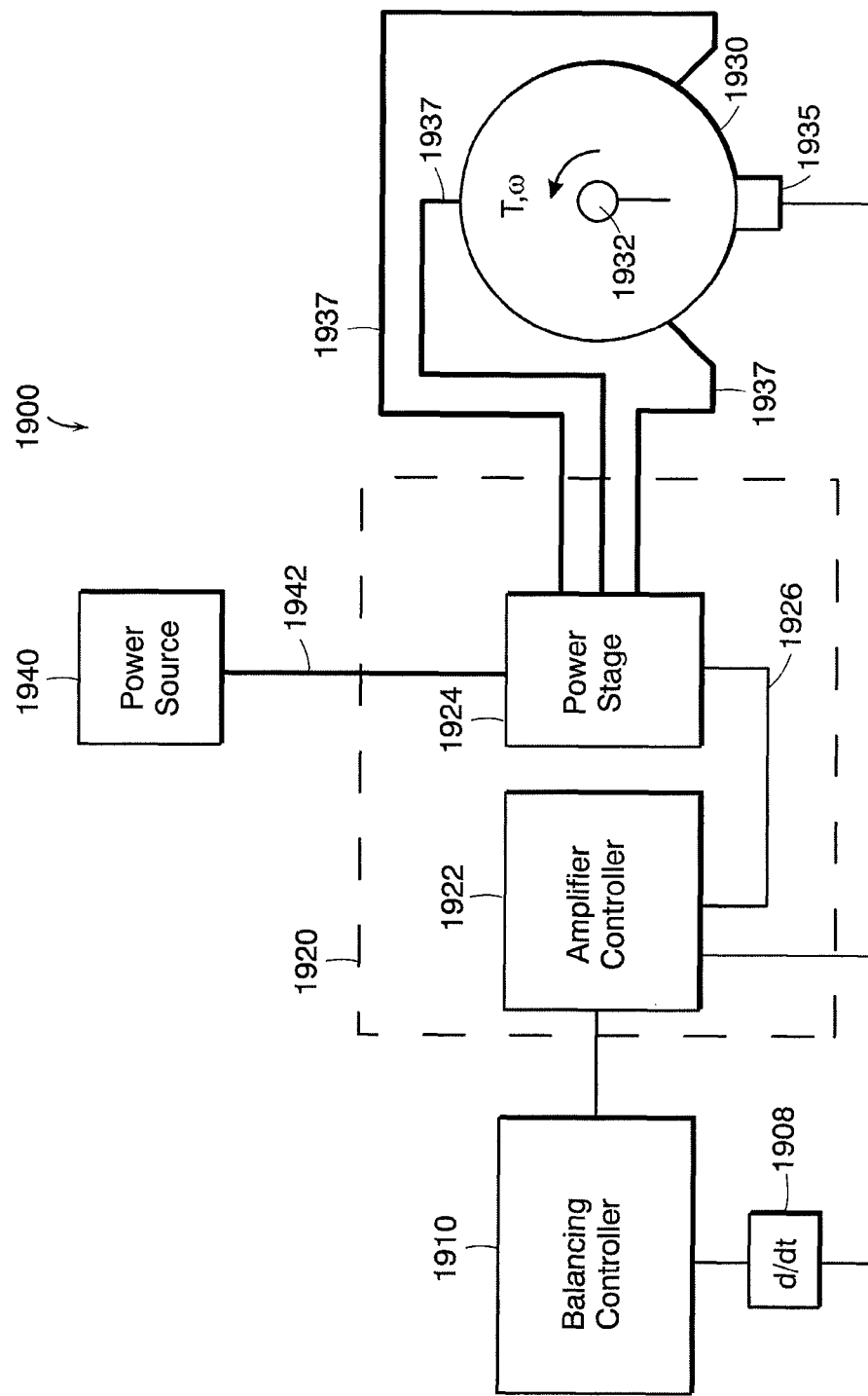
FIG. 19 is a block diagram of the power drive module of an embodiment of the present invention.

FIG. 19 shows a block diagram of a power module 1900 of one embodiment of the present invention. A balancing controller 1910 generates a command signal that is provided to motor amplifier 1920. Motor amplifier 1920 applies the appropriate power to motor 1930 based on the command signal. Balancing controller 1910 receives inputs from the user and system sensors and applies a control law, as discussed in detail below, to maintain balance and to govern motion of the transporter in accordance with user commands. Motor 1930 rotates a shaft 1932 that supplies a torque, T, at an angular velocity, ω, to one or more wheels (e.g., wheels 20 and 21 shown in FIG. 1) that is attached to shaft 1932. In an embodiment of the present invention, motor 1930 is a three-coil brushless DC motor. In that embodiment, motor 1930 has three sets of stator coils although any number of coils may be used. The stator coils are electrically connected to a power stage 1924 by coil leads 1937 capable of conducting large currents or high voltages.

Motor amplifier 1920 contains both an amplifier controller 1922 and a power amplification stage 1924. Amplifier controller 1922 may be configured to control either current or voltage applied to the motor 1930. These control modes may be referred to as current control mode and voltage control mode, respectively. Power stage 1924 switches the power source 1940 into or out of connection with each coil, based on the switching of the power stage 1924. The power stage 1924 is controlled by the amplifier controller 1922. An inner loop 1826 senses whether the output of power stage 1924 is equal to the commanded value and feeds back an error signal to amplifier controller 1922 at a closed loop bandwidth, preferably on the order of 500 Hz. The amplifier controller alters the output of the power stage 1824 based on the error signal. Additionally, control by amplifier controller 1922 is based, in part, on a feedback signal from shaft feedback sensor (SFS) 1935.

Shaft feedback sensor 1935 is coupled to balancing controller 1910. Shaft feedback sensor 1935 provides information related to the shaft position or motion to the balancing controller 1910. The shaft feedback sensor 1935 may be any sensor known in the sensor art capable of sensing the angular position or velocity of a rotating shaft and includes tachometers, encoders, and resolvers. In order to obtain a measure of shaft rotation velocity from a position signal provided by shaft feedback sensor 1935, the position signal is differentiated by differentiator 1908. The outer feedback loop 1942 operates at a bandwidth characteristic of the balance control provided by balance controller 1910 and may be as low as 20-30 Hz.

Figure 20:
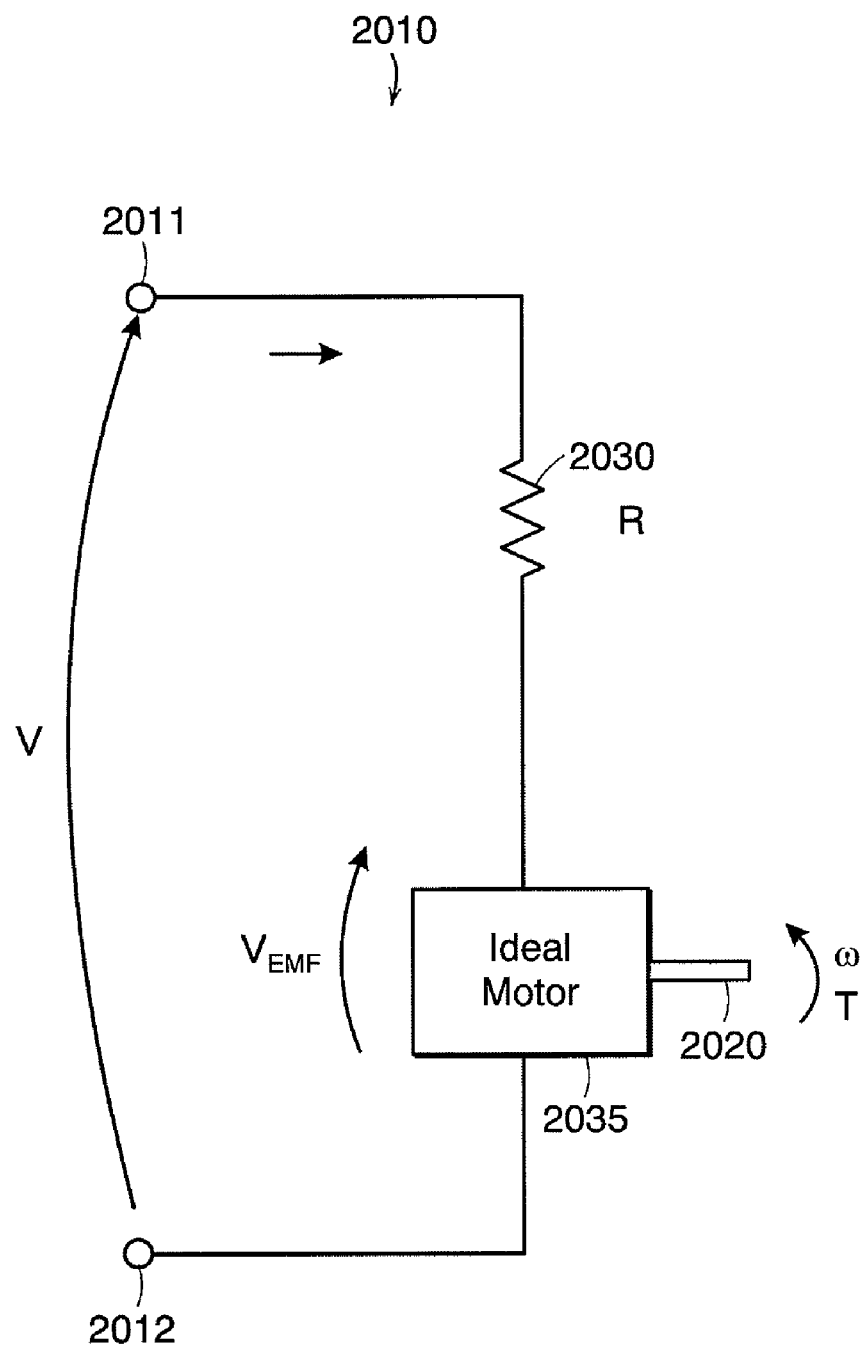
FIG. 20 is an electrical model of a motor, according to an illustrative embodiment of the invention.

While current and voltage control may be equivalent in certain applications, voltage control is advantageously applied in embodiments of transporter control where the outer loop bandwidth is more than 3-4 times slower than the inner closed loop bandwidth. FIG. 20 shows an electrical model 2010 of a motor. The motor has a pair of terminals 2011, 2012 across which a voltage V is applied. Motor 2010 also has a rotating shaft 2020 characterized by a shaft velocity, D, and a torque, T. Motor 2010 may be modeled by resistor 1930 of resistance R carrying a current i in series with an ideal motor 1935 having a voltage drop $V_{emf}$. For an ideal motor:

$$V_{emf}=k_v \omega \qquad \text{(EQN. 7)}$$

$$T=k_c * i \qquad \text{(EQN. 8)}$$

where $k_v$ and $k_c$ are motor constants. Series resistor 2030 models the losses of the motor 2010.

Figure 21:
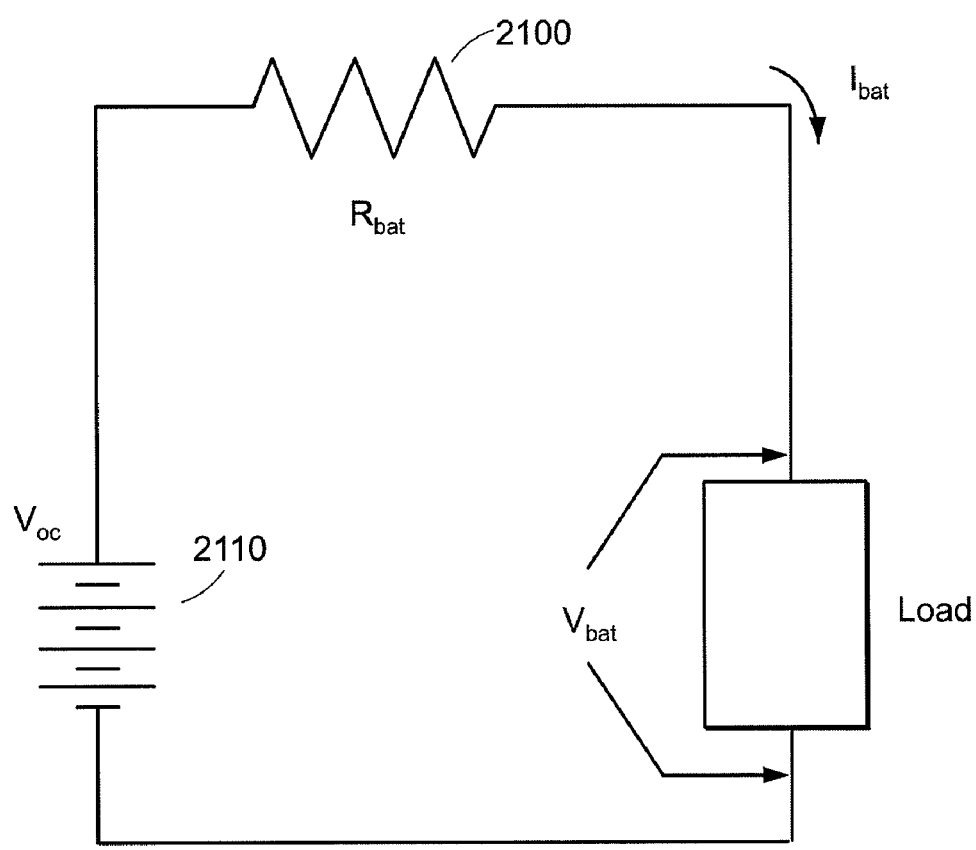
FIG. 21 is a circuit diagram of a battery in series with a load in accordance with an embodiment of the present invention.

In a further embodiment of the invention, a method for estimating the instantaneous capability of a battery is provided. As shown in FIG. 21, a simplified model 2100 is used for the battery, consisting of a "perfect" DC voltage source 2110 with "open circuit" voltage, $V_{oc}$, a series resistance for the battery, $R_{bat}$, a current, $I_{bat}$, and a battery voltage, $V_{bat}$. $V_{oc}$ and $R_{bat}$ cannot be measured but can be estimated from measurements of $V_{bat}$ and $I_{bat}$. Ideally, these variables should follow a linear relationship:

$$V_{bat}=V_{oc}-(I_{bat}*R_{bat}) \qquad \text{(EQN. 9)}$$

Since this linear relationship is ideal, measured values of $V_{bat}$ and $I_{bat}$ will likely present a "scatter plot." Note that "statistical", as used herein, refers to the drawing of inferences as to the value of a parameter based on sampling the value by measurement at intervals that may be regular or irregular with respect to distribution of the samples in time or in terms of another dimension. The verb "filter," as used herein, refers to the process of extracting a value attributable to a single point in time from a plurality of data that may be obtained in successive samplings and may be subject to either random or systematic fluctuations, or both. Application of filtering techniques, as are known in the art, to the data allows estimated values of $V_{oc}$ and $R_{bat}$ to be derived. For example, a regression analysis using a least squares technique may be employed to derive estimated values of $V_{oc}$ and $R_{bat}$ from the measured values of $V_{bat}$ and $I_{bat}$. $V_{oc}$ and $R_{bat}$ will change, such as, for example, due to ambient temperature, battery temperature, battery age, battery usage (both the overall amount of usage and usage pattern), and over time as the battery charge is depleted (and/or regenerated). Accordingly, a more accurate estimate may be obtained if the more recent measured values of $V_{bat}$ and $I_{bat}$ are used for the regression or more recent values are weighted more heavily than older values.

Figure 22:
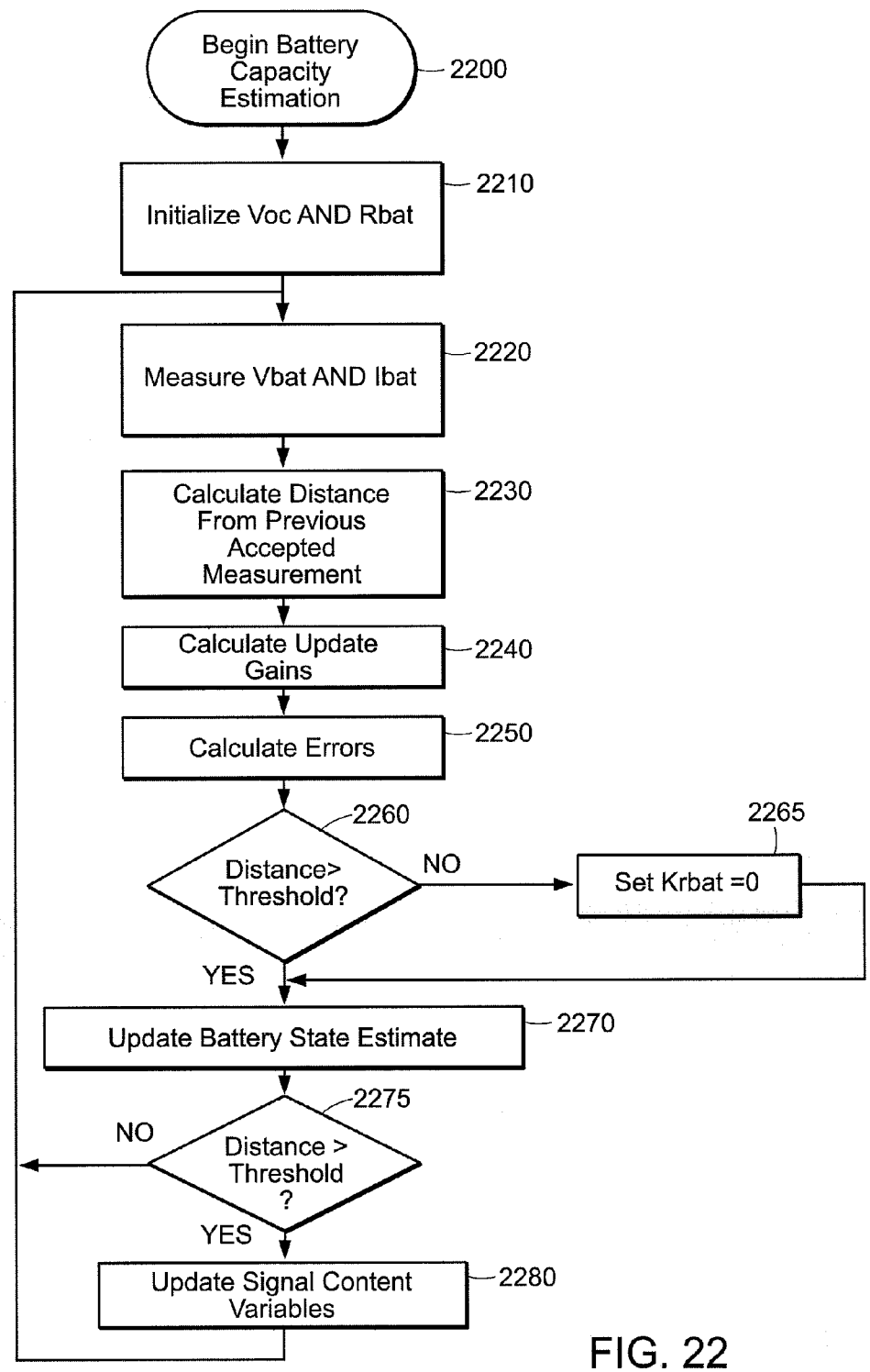
FIG. 22 is a flow diagram illustrating a method for estimating battery parameters, according to an illustrative embodiment of the invention.

In another specific embodiment of the invention, as shown in FIG. 22 (step 2200), newly measured values of $V_{bat}$ and $I_{bat}$ are used to correct the estimated values of $V_{bat}$ and $I_{bat}$ using a low pass filtering algorithm. The variables are initialized (step 2210), with $V_{oc}$ and $R_{bat}$ set to typical values. $V_{bat}$ and $I_{bat}$ are measured periodically (step 2220). To ensure that the signal is sufficiently "rich" (i.e., there is a statistically significant difference between data points), the squared distance, D, of $V_{bat}$ and $I_{bat}$ from the last accepted values of these variables, $V_{prev}$ and $I_{prev}$, is calculated (step 2230).

The distance from previously accepted measurements identifies data points that may provide additional information from which to refine the estimate of current battery parameters. For example, when the transporter is at rest, little current is drawn and a series of such measurements could skew the estimated value for the battery parameters from their true values, as filtering progresses. An appropriately set threshold for D can be used to mitigate the impact of such data points on the estimate.

The following calculations may then be performed:
(1) calculate update gains $K_{voc}$ and $K_{rbat}$ (step 2240):

$$\begin{bmatrix} K_{voc} \\ K_{rbat} \end{bmatrix} = \begin{bmatrix} p_a & p_b \\ p_b & p_c \end{bmatrix} \begin{bmatrix} 1 \\ -I_{bat} \end{bmatrix} = \begin{bmatrix} p_a - p_b * I_{bat} \\ p_b - p_c * I_{bat} \end{bmatrix} \qquad \text{(EQN. 10)}$$

where, $p_a$ is the direct $V_{oc}$ covariance matrix element, $p_b$ is the cross coupling covariance matrix element, and $p_c$ is the direct $R_{bat}$ covariance matrix element,
(Note: $p_a$, $p_b$ and $p_c$ represent the uncertainty in the state estimate);
(2) calculate error between battery state estimate and the new data point (step 2250):

$$Err=V_{bat}-(V_{oc}-I_{bat}*R_{bat}) \qquad \text{(EQN. 11)}$$

(3) update battery state estimate (step 2270):
(If D is less than the threshold (step 2260), $K_{rbat}$ is set to zero (step 2265) so that $R_{bat}$ is not updated.)

$$V_{oc}=V_{oc}+K_{voc}*Err \qquad \text{(EQN. 12)}$$

$$R_{bat}=R_{bat}+K_{rbat}*Err \qquad \text{(EQN. 13)}$$

(4) update signal content variables (step 2280), if D is greater than the threshold (step 2275)

$$V_{prev}=V_{bat} \qquad \text{(EQN. 14)}$$

$$I_{prev}=I_{bat} \qquad \text{(EQN. 15)}$$

The process can continue with repeated measurement of $V_{bat}$ and $I_{bat}$ (step 2220), thereby continually updating the estimates of $V_{bat}$ and $I_{bat}$.

In another embodiment of the invention, estimated values of battery parameters are used to calculate a maximum operating speed for a transporter based on the state of the battery and other transporter parameters, such as motor current. For example, the maximum operating speed of the transporter, Y, may be modeled by a linear equation of the form:

$$Y=M*I_{max}+B \qquad \text{(EQN. 16)}$$

The values for M and B may vary over time and either M or B may be functions of current values of transporter operating parameters such as battery open circuit voltage and internal resistance and motor parameters, such as back EMF gain and motor resistance.

Actuator systems have a physical limit on the amount of torque they can supply and the amount of electric current that can be in the system. The amount of output torque and current in the actuator system are interrelated, the torque is a function of the current (and vice versa), as shown above in EQN. 8, in connection with FIGS. 19 and 20. In voltage control mode, adjusting the amount of torque adjusts the overall current in the actuator system. Similarly, a current limit limits the amount of torque that can be output by the actuator system. In this manner, if an actuator has a maximum torque, the current capability also has a maximum. The physical limit on the total amount of electric current in the actuator system applies to all forms of current (e.g., ambient temperature, battery age, current generated by acceleration or deceleration). Any current passing through the vehicle drive utilizes some given portion of the total drive capability and contributes to the overall current limit. For example, regeneration current (the current generated by applying a torque in the direction opposite of the direction of travel) reduces the amount of current available for braking. That is because both the regeneration current and the braking current are negative and add towards the overall current limit. Typically, an actuator system may monitor how much current (i.e., amount of torque that can be applied in response to the available current) capability is being used for acceleration or deceleration, and then estimates the remaining current handling ability. By estimating the remaining current handling ability, the system can limit vehicle performance or provide additional braking force through some other means.

A dynamically stabilized transporter such as the one described above may operate so as to maintain a margin for its drive actuator to handle various motoring transients which may arise (for example, needing to accelerate the wheels over small obstacles). That is, for some operating conditions, the wheels need to accelerate to stay underneath the center of mass so as to maintain balance of the vehicle. Similarly, there may be an operational constraint that requires some actuator margin be maintained so as to bring the vehicle to safe stop if the system integrity fails. When traveling uphill or on a flat surface, the vehicle stops by accelerating the wheels out in front of the center of mass causing the system to pitch backwards. The backward pitch causes a reduction or reversal in torque subsequently reducing speed.

The transporter performance is limited and its speed reduced by modulating the pitch of the transporter. This performance reduction can be related to the overall current. That is, the greater the weight of the vehicle and payload and steeper the slope, the more current created. For example, additional current can be required when traveling uphill, due to the increase in torque needed to pitch the vehicle back before stopping. Alternatively, additional current can be created when traveling downhill, due to the regeneration current created when braking. Additional current contributes to the overall current which can cause the overall current limit (i.e., the physical current limit) to be reached, resulting in lowering the speed limit. A lower speed limit lowers the amount of possible sustained deceleration. Reducing the speed limit does not increase the braking capability, but rather puts the system into an operational state where it is less likely to need to use the braking capability, and where the braking capability is used for a shorter time than from a higher initial speed. Because the transporter uses the electric motor to generate braking forces, the very act of slowing down also regenerates current.

Various methods exist for measuring the speed and acceleration of the vehicle which can be used in embodiments of the invention. For example, rotary encoders can be used to measure the speed of one or more wheels of the vehicle. The derivative of the speed of the vehicle with respect to time can be used to determine the acceleration of the vehicle. Further, accelerometers can be used to determine the acceleration of the vehicle.

Figure 23:
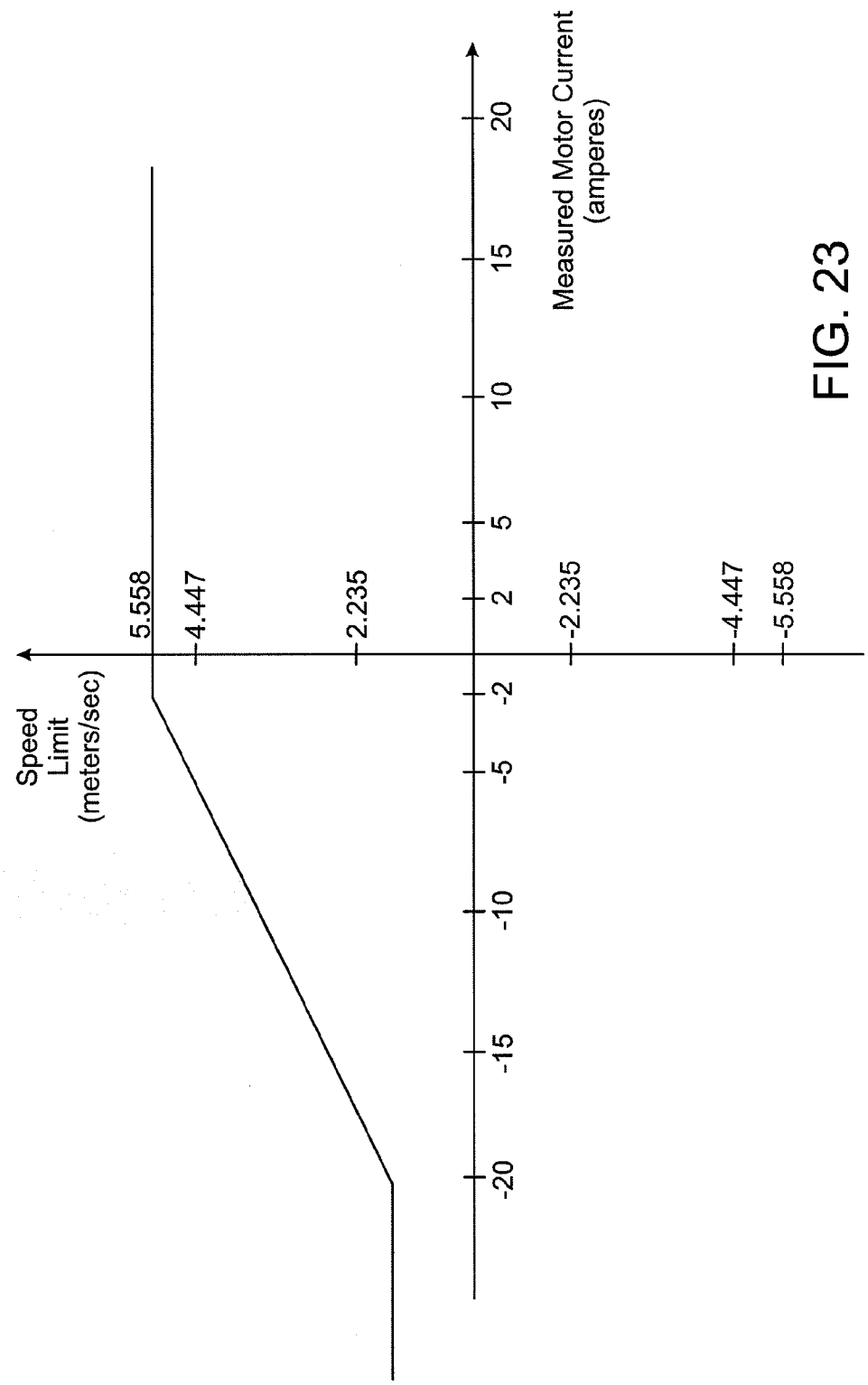
FIG. 23 illustrates the relationship between measured motor current and vehicle speed limit for an exemplary balancing transporter, according to an illustrative embodiment of the invention.

FIG. 23 illustrates a relationship between measured motor current and speed limit for an illustrative embodiment of the invention. When the measured motor current is greater than or equal to −2(A), the vehicle speed is set to 5.558 (m/s). When the measured motor current is less than or equal to −20(A), the vehicle speed is set to 1.178(m/s). When the measured motor current is between −2(A) and −20(A) the speed is limited along a strait line between −2(A) and −20(A). The values of these limits (current values and/or speed limits) can vary, depending on, for example, a specific user experience level.

In some embodiments, the overall current limit is based on operating characteristics of the transporter traveling uphill. In some embodiments, the overall current limit is based on the operating characteristics of the transporter traveling downhill. In some embodiments, a measured motor current threshold (e.g., 2(A) as shown in FIG. 23) must be reached for speed limiting to start.

In vehicles that do not incorporate the principles of the present invention, positive feedback results during acceleration or deceleration which causes erroneous slowing of the transporter. The positive feedback causes additional unnecessary slowing because the speed is further limited in response to an exceeded current threshold. The lower speed limit requires acceleration when traversing uphill and deceleration when traversing downhill. The acceleration or deceleration causes a further increase in current because an even greater torque than the torque that initially caused the current threshold to be exceeded must be applied to further accelerate or decelerate the vehicle. The current threshold is then further exceeded because the greater the torque, the more current is generated. This overall current increase-deceleration cycle (besides eventually causing a complete undesirable stop) further reduces the available performance margins for responding to transients and failures. In vehicles that incorporate principles of the present invention, the additional current from the acceleration or deceleration is accounted for so it is not seen as additional current from slope and payload. To minimize the effect of the current associated with the slope and weight of the vehicle and payload, and to avoid unnecessary performance reduction (speed limiting) and improve transient dynamics, the control algorithm separates out the actuator current needed for traveling up or down a slope from the current required for acceleration or deceleration. An estimate of the amount of measured current due to acceleration or deceleration may be removed from the measured overall current. Removing the amount of current due to acceleration or deceleration allows the speed limit to be set based on the current resulting from the slope and payload only, which was the original intent.

Figure 24:
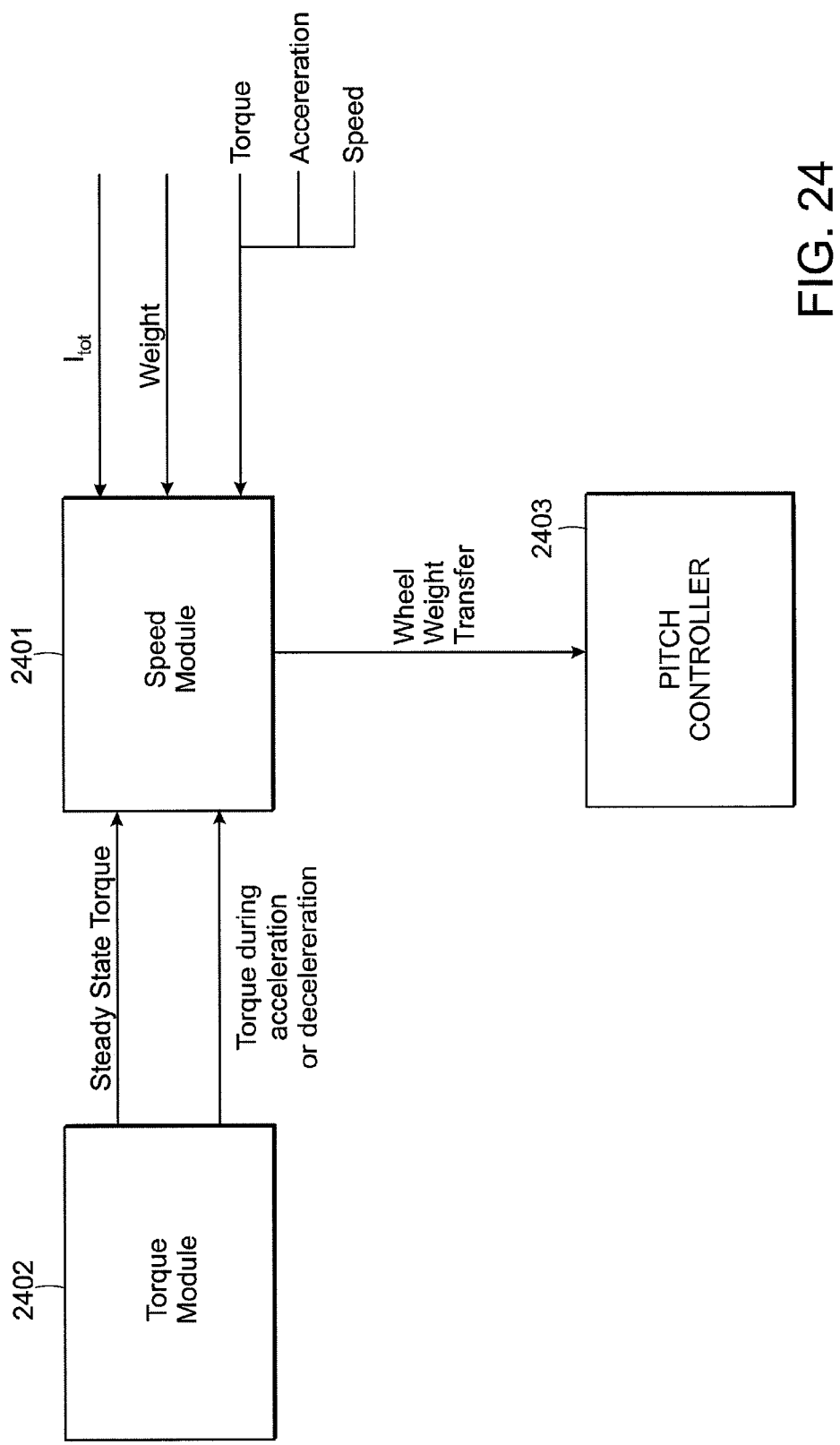
FIG. 24 is a schematic depicting speed limiting of a transporter controller in accordance with an embodiment of the present invention.

FIG. 24 is a schematic depicting speed limiting of a transporter controller in accordance with an embodiment of the present invention. A torque module 2402 determines steady-state average torque and torque during acceleration or deceleration of the vehicle traveling over an underlying surface. The steady-state average torque and the torque during acceleration or deceleration are provided to a speed module 2401. The speed module 2401 also receives input signals representing the measured overall current ($I_{tot}$), overall weight of the system of the vehicle and its payload (e.g., rider or load), vehicle torque, vehicle acceleration, and vehicle speed. In this embodiment, the output of the speed module 2401 is a desired pitch angle because the pitch angle determines the speed of the transporter. The desired pitch angle is provided to a pitch controller 2303 which controls the pitch of the transporter.

Speed of some vehicles is not controlled by controlling the pitch of the vehicle. In these vehicles, a speed controller is used to control the vehicle speed by varying, for example, a throttle command signal applied to the vehicle throttle rather than by varying a commanded pitch angle applied to the vehicle motor.

Figure 25:
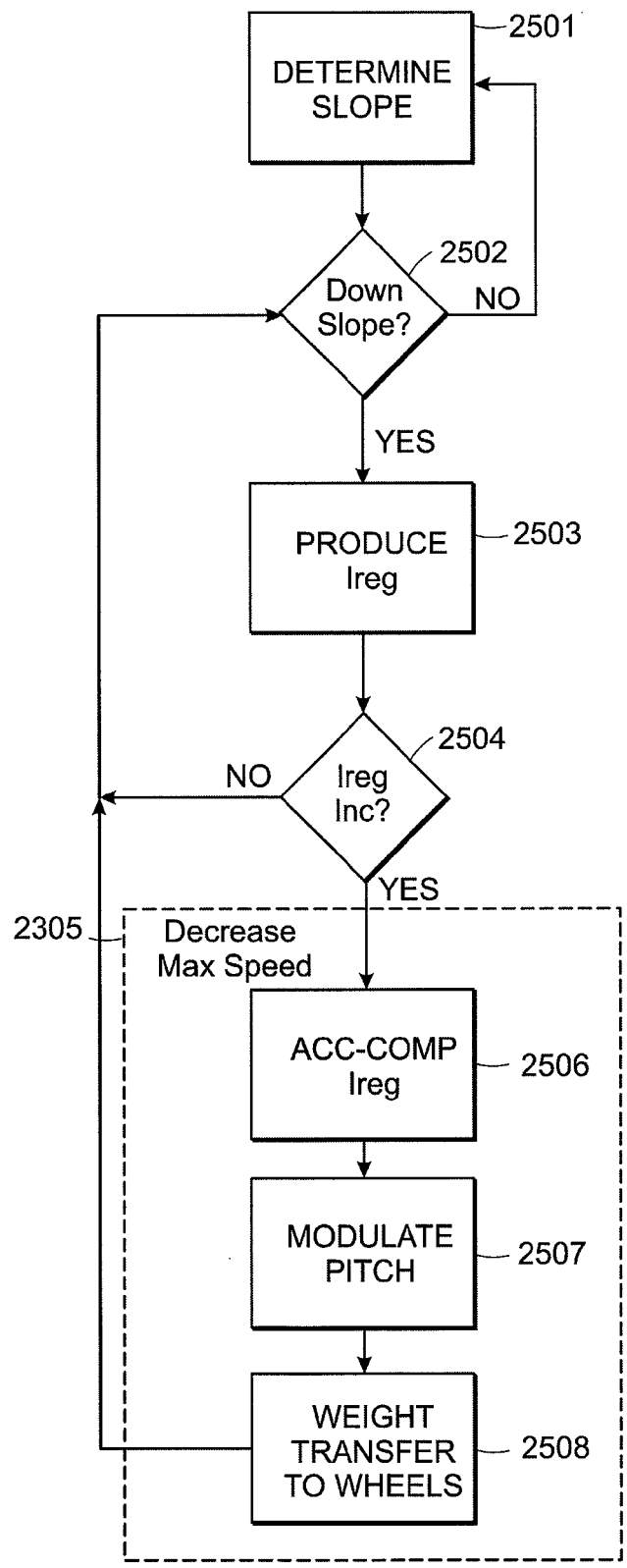
FIG. 25 is a flow chart depicting operation of speed limiting of a transporter controller in accordance with an embodiment of the present invention.

FIG. 25 is a flow chart depicting operation of speed limiting of a transporter controller when traveling downhill in accordance with an embodiment of the present invention. The torque module 2402 of FIG. 24 senses and determines the slope of the underlying surface over which the vehicle is traveling, step 2501. When the vehicle is traveling downhill step 2502, regeneration current ($I_{reg}$) is created and measured, step 2503. If the regeneration current is increasing (step 2504) then the maximum allowable speed limit of the vehicle is decreased (step 2505) based on compensating the regeneration current signal for vehicle acceleration as explained above. An acceleration-compensated average current signal is produced (step 2506) which causes the pitch of the transporter to be modulated (step 2507) by the pitch controller 2503. The pitch controller 2503 controls the pitch of the transporter based on weight transfer to the wheels (step 2508).

In effect, the acceleration-compensated average current is an estimate of the combined effects of slope and payload. In the embodiment of the invention implemented in a dynamically stabilized transporter, a generalized estimate (e.g., a fixed gain in the vehicle control system) of vehicle and payload mass may be used in determining the acceleration-compensation average current. For example, in one embodiment, the estimate is that 5 amps are required to decelerate the vehicle by one meter per second. In other embodiments, the total system weight is measured or estimated.

Principles of the present invention may be employed with a variety of other types of vehicles. In some embodiments of the invention, principles of the present invention are used with statically stables vehicles (e.g., automobiles, all-terrain vehicles). For example, in one embodiment of the invention, the principles of the present invention are applied to a four wheel, statically stable automobile. The automobile includes two or more electric motors coupled to wheels of the automobile. The electric motors are used as the primary means of acceleration and deceleration of the automobile. Referring to FIGS. 24 and 25, instead of using pitch of the automobile to control the speed of the automobile, a separate controller and/or actuator is used to control the speed of the vehicle based on, for example, the acceleration-compensated average current signal. For example, the acceleration-compensated average current signal may be provided to an actuator that controls engine throttle of the automobile, thereby controlling the speed of the automobile. Alternative apparatus and methods for controlling the speed of a vehicle are within the scope of this invention.

In one embodiment, the acceleration-compensated average current depends on the total system weight. The total system weight can be accurately reflected by measuring or estimating the weight transferred to the wheels.

In one embodiment, the slope of the surface and the weight of the payload may be estimated based on measurements of torque, acceleration, and speed. The slope and payload estimates based on measurements of torque, acceleration, and speed may also be generally applied to the monitoring and limiting of vehicle performance related to performance limits for hill climbing.

In some embodiments, the maximum allowable speed limit, (e.g., in step 2505 of FIG. 25) increases when the regeneration current decreases. When the regeneration current decreases the overall actuator capability increases allowing more actuator capability for braking. This results in the increase in the maximum allowable speed limit. In some embodiments, the regeneration current limit may be higher based on the user experience. A more experienced user is likely to know how to the ride the vehicle in a manner that minimizes the need to brake or slow the vehicle during certain maneuvers. For example, the user may know the appropriate body positioning for sharp turns or the appropriate speeds to traverse various terrain. This experience can allow the actuation system to be set at a higher current limit threshold because less actuator capability is needed for braking and transients. Thus, embodiments provide smooth control of electric vehicle speed going downhill, even if the speed limit is lowered during descent. In addition, the increased margins of speed and torque are preserved for responding to transients or system failures.

The described embodiments of the invention are intended to be merely exemplary and numerous variations and modifications will be apparent to those skilled in the art. In particular, many of the controllers and methods of direction and speed control described herein may be applied advantageously to electric vehicles that are not balancing personal transporters. Balancing transporters present particular requirements for controlling the vehicle as discussed in the foregoing description and in U.S. Pat. No. 6,789,640. All such variations and modifications are intended to be within the scope of the present invention as defined in any appended claims.

The invention claimed is:

1. A method for controlling the speed of a vehicle having an electric motorized drive, the method comprising:
   determining a steady-state torque signal and acceleration or deceleration torque signal of the vehicle traveling down a sloped surface; and
   controlling speed of the vehicle when traveling down the sloped surface and when a measured actuator regeneration current exceeds a threshold, the actuator current being generated by a motorized drive arrangement of the vehicle that applies torque to at least one ground-contacting element of the vehicle for braking;
   wherein the speed of the vehicle is controlled based on:
      the steady-state torque signal;
      the acceleration or deceleration torque signal of the vehicle;
      a measured actuator regeneration current;
      weight of the vehicle and a payload;
      the torque applied to the ground-contacting element;
      acceleration of the vehicle; and
      the speed of the vehicle.

2. The method of claim 1, wherein controlling speed of the vehicle comprises determining an acceleration-compensated average current.

3. The method of claim 1, wherein controlling the speed of the vehicle comprises determining an amount of actuator current required for accelerating or decelerating the vehicle.

4. The method of claim 1, wherein determining the amount of actuator current required for accelerating or decelerating the vehicle is based on the speed of the vehicle and slope of the surface.

5. The method of claim 2, wherein the acceleration-compensated average current is determined by subtracting actuator current caused by deceleration from the measured actuator current of the vehicle.

6. The method of claim 2, wherein the acceleration-compensated average current is determined by subtracting actuator current caused by acceleration from the measured actuator current of the vehicle.

7. The method of claim 1, wherein the vehicle is a dynamically stabilized transporter and maximum allowable speed of the vehicle is controlled by modulating a pitch component of the vehicle.

8. The method of claim 7, wherein a pitch controller modulates the maximum allowable speed of the vehicle based on the acceleration-compensated average current.

9. The method of claim 8, comprising decreasing the maximum allowable speed of the vehicle if a regeneration current is increasing.

10. The method of claim 8, comprising increasing the maximum allowable speed of the vehicle if a regeneration current is decreasing.

11. The method of claim 1, wherein acceleration and deceleration of the vehicle is achieved at least primarily by operation of the motorized drive arrangement.

12. The method of claim 1, wherein the speed of the vehicle is limited when the measured current exceeds an overall current threshold.

13. The method of claim 12, wherein the overall current threshold is based on experience level of a user.

14. The method of claim 1, wherein the vehicle is a statically-stable transporter.

15. The method of claim 1, wherein the weight of the vehicle and a payload is an estimate.

* * * * *